US008125922B2

(12) United States Patent
Young et al.

(10) Patent No.: US 8,125,922 B2
(45) Date of Patent: Feb. 28, 2012

(54) METHOD AND APPARATUS FOR GENERATING A RANKED INDEX OF WEB PAGES

(75) Inventors: Malcolm P. Young, Newcastle Upon Tyne (GB); Peter E. Andras, Newcastle Upon Tyne (GB); Mark A. O'Neill, Newcastle Upon Tyne (GB); Simon P. Martin, Newcastle Upon Tyne (GB)

(73) Assignee: Searchbolt Limited, Newcastle Upon Tyne (GB)

( * ) Notice: Subject to any disclaimer, the term of this patent is extended or adjusted under 35 U.S.C. 154(b) by 355 days.

(21) Appl. No.: 12/561,790

(22) Filed: Sep. 17, 2009
(Under 37 CFR 1.47)

(65) Prior Publication Data
US 2010/0114862 A1    May 6, 2010

Related U.S. Application Data

(63) Continuation-in-part of application No. 12/267,926, filed on Nov. 10, 2008, now Pat. No. 7,768,942, which is a continuation of application No. 11/118,071, filed on Apr. 29, 2005, now Pat. No. 7,466,663.

(30) Foreign Application Priority Data

Oct. 29, 2002   (GB) .................................. 0225109.8
Oct. 29, 2003   (GB) ................. PCT/GB2003/004678
Sep. 17, 2008   (EP) ..................................... 08164486
Nov. 24, 2008   (EP) ..................................... 08169814

(51) Int. Cl.
*H04J 1/16*        (2006.01)
*H04L 12/56*     (2006.01)
(52) U.S. Cl. .......................... 370/252; 370/282; 370/386
(58) Field of Classification Search .................. 370/252, 370/282, 386
See application file for complete search history.

(56) References Cited

U.S. PATENT DOCUMENTS 5,748,844 A    5/1998   Marks
(Continued)

FOREIGN PATENT DOCUMENTS

EP            0 507 110         10/1992
(Continued)

OTHER PUBLICATIONS

Schroeder, M. A., et al, "Enhanced network survivability through balanced resource criticality", Oct. 15, 1989, pp. 682-687.
(Continued)

*Primary Examiner* — John Pezzlo
(74) *Attorney, Agent, or Firm* — Brooks, Cameron & Huebsch, PLLC

(57) ABSTRACT

After a sample set of web pages (7) has been retrieved via the Internet (4) and stored in a web page data base (11) the web pages (7) are processed by a network analysis engine (15) to generate network data indicative of the interconnections between the sample web pages (7) as identified by hyperlinks included in the retrieved web pages (7). The network analysis engine (15) then utilizes the generated network data to calculate for each web page (7) a number of network metrics indicative of the extent to which the interconnections associated with a web page (7) correspond to patterns of interconnections associated with web pages (7) published in order to manipulate the ranking of a web page (7) by a search engine (3). These network metrics are then used to generate a numbers of ranked indexes of web pages (7). A user can then submit a search query to the search engine (3) together with an indication of which of the rankings should be used. In response the search engine (3) returns a results list (6) based on the search query using the selected rankings. By having a variety of rankings emphasizing metrics associated with different patterns of connectivity a user is thereby able to tailor their search strategy and obtain a results list (6) identifying web pages of greater interest to the user.

42 Claims, 13 Drawing Sheets

U.S. PATENT DOCUMENTS

| | | | |
|---|---|---|---|
| 6,038,390 | A | 3/2000 | Sofman |
| 6,065,063 | A | 5/2000 | Abali |
| 6,167,492 | A | 12/2000 | Keller et al. |
| 6,229,791 | B1 | 5/2001 | Nusekabel et al. |
| 6,437,804 | B1 | 8/2002 | Ibe et al. |
| 6,826,572 | B2 * | 11/2004 | Colace et al. ......... 1/1 |
| 7,466,663 | B2 | 9/2009 | Young et al. |
| 2005/0262050 | A1 | 11/2005 | Fagin et al. |
| 2006/0069667 | A1 | 3/2006 | Manasse et al. |
| 2006/0095416 | A1 | 5/2006 | Barkhin et al. |
| 2006/0143197 | A1 | 6/2006 | Kaul et al. |
| 2008/0071773 | A1 | 3/2008 | Gross |

FOREIGN PATENT DOCUMENTS

| | | |
|---|---|---|
| EP | 0 637 153 | 2/1995 |
| EP | 0652 665 | 5/1995 |
| EP | 0 887 749 | 12/1998 |
| EP | 1 158 447 | 11/2001 |
| WO | WO 0193504 | 12/2001 |
| WO | WO 0197463 | 12/2001 |

OTHER PUBLICATIONS

Noakes, M. D., et al., "An adaptive link assignment algorithm for dynamically changing topologies", Oct. 23, 1988, pp. 683-689.

Van Helden, J., et al., "Representing and analysing molecular and cellular function using the computer", Biol. Chem., vol. 381 Sep./Oct. 2000, pp. 921-935.

Dogan, A. et al., "Matching and scheduling algorithms for minimizing execution time and failure probability of applications in heterogeneous computing", IEEE Transactions on Parallel and Distributed Systems, vol. 13, No. 3, Mar. 2002, pp. 308-323.

Tarjan, R., "Depth-first search and linear graph algorithms", Switching and Automata Theory, 1971. 12th Annual Symposium on, IEEE, Piscataway, NJ, USA, Oct. 13, 1971, pp. 114-121.

Vilar, J., "Minimal cuts up to third order in a planar graph", IEEE Transactions on Reliability, vol. R-33, No. 3 Aug. 1984, pp. 250-256.

Zien, et al., "Identification of drug target proteins", ERCIM News No. 43, Oct. 2000, pp. 1-3.

European Search Report for related EP Application No. 09172242.1-2416, Jan. 19, 2010, 7 pages.

European Search Report for related EP Application No. 09172247.0-24162157734, Apr. 8, 2010, 9 pages.

Zien et al., Identification of Drug Target Proteins, ERCIM News, Oct. 2000, No. 43 (Internet).

European Search Report, Jan. 14, 2009.

* cited by examiner

METHOD AND APPARATUS FOR GENERATING A RANKED INDEX OF WEB PAGES

CROSS-REFERENCE TO RELATED APPLICATIONS

This application is a continuation in part of U.S. application Ser. No. 12/267,926, filed Nov. 10, 2008, now U.S. Pat. No. 7,768,942 which was a continuation of U.S. application Ser. No. 11/118,071, filed Apr. 29, 2005, now U.S. Pat. No. 7,466,663, which claimed priority to PCT/GB2003/004678 filed Oct. 29, 2003, which claimed priority to GB0225109.8 filed Oct. 29, 2002, the specifications of which are herein incorporated by reference. This application also claims priority to EP08164486.6 filed Sep. 17, 2008 and EP08169814.4 filed. Nov. 24, 2008, the specifications of which are herein incorporated by reference.

TECHNICAL FIELD

The present application relates to method and apparatus for generating a ranked index of web pages.

More specifically, it relates to the use of network analysis to identify particular patterns of connectivity between web pages on the world wide web which enables web pages to be ranked in a number of different ways. Different rankings can then be utilized to tailor the ranking of web pages in response to a user search query.

Further, through this analysis it may be possible to identify motifs or patterns of hypertext links between web pages which are indicative of attempts to manipulate the ranking of a target web page within search engine results. Search engine results can then be improved by not mentioning such a target web page in the results or reducing a rank associated with a web page associated with such patterns or motifs.

INTRODUCTION

Internet users wishing to retrieve information from the world wide web (WWW) will often submit a query containing search words to an Internet search engine. Such a search engine will provide a user with a results list of web sites, or items contained in websites, in response to a query from the user. A results list will contain references to web sites, or parts of websites, which the search engine considers match the search terms. The match can be an exact match, or provision can be made for the search engine to provide near matches, near matches being determined by truncations, letter transpositions or letter replacements within the search terms. The results list will be sorted based on how well web pages match the query and respective ranks associated with matching pages.

In order to obtain the information needed to be able to provide a user with a results list in response to a query, most search engines use computer programs called web crawlers or spiders to search the internet, downloading web pages from servers. It is not possible, due to constraints in communication bandwidth and computing resources, for a web crawler to download every web page on the world wide web. Necessarily, search engines only search a subset of web pages. A number of different search prioritization methods, such as breadth first searching, may be used to ensure that the most valuable pages are downloaded as efficiently as possible. Typically the downloaded pages are stored temporarily, in a memory device such as for example a server's read only memory, to be processed by the search engine for indexing.

In order to produce an index for use by a search engine in responding to a user's query, the information from downloaded web pages is compressed, sorted and stored. Typically the downloaded pages are stored temporarily, in a memory device to be processed by the search engine for indexing. The downloaded pages are then parsed and processed. Processing the information includes extracting words contained within the pages as well as the number of occurrences of the words, their location in the pages, font size and the like. Processing the information also includes extracting hypertext links included in the web pages. The processed information from a web page is stored such that it can be addressed according to the words contained within the page. The stored information is also used to rank the page, that is, to quantify how useful the page will be to a user based on the search terms of a query.

In order to rank the matches to a query, ranking algorithms are used which are usually based on simple link analysis techniques. These algorithms include HitList™ and Google's™ PageRank™. The aim of these algorithms is to rank a page based on a measure of the page's authority using a mechanism based on the number of links to the page from other pages. The underlying assumption with such a ranking is that many Internet users will choose to incorporate in their web pages links to relevant or authoritative web pages.

A problem associated with link-based ranking algorithms such as PageRank™ is that it is possible for a web site designer to employ techniques which capitalize on their knowledge of search engine link analysis algorithms in order to improve the rank of their web site artificially. Such techniques are often referred to as "spamming" and the web pages which are the target of spamming techniques are know as "spam" web pages. For example, spamming techniques include creating numerous web pages for the sole purpose of linking to a target (spam) web page and thereby raising the ranking of that web page. This spam technique is commonly referred to as link farming.

It would be advantageous for search engines to be able to identify spam web pages, either so that they may be removed from a results list or so that their rank may be reduced. It would also be advantageous to reduce the impact of such pages on the rankings of related pages. It is therefore desirable to provide an efficient method of identifying patterns of links between web pages which are indicative of spamming so that spam web pages may be discovered more efficiently and effectively.

Further, it is a limitation of known link-based algorithms such as PageRank™ that the only two link-based considerations when calculating a web page's rank are the number of links to and from the page and the ranks of the other pages which link to the page. The premise being that if important pages and/or many pages link to a page, the linked to page is deemed to be important by an authoritative web page and/or is popular and, therefore, it should be ranked highly. This is a limitation because the premise is an over simplification of the interconnections on the world wide web.

It would be desirable to be able to provide a more nuanced ranking of websites based upon other characteristics in addition to the existing known link-based algorithms. Where multiple different ranking metrics can be calculated a user can select the manner in which websites are to be ordered based upon their own individual search strategies. Such an approach should enable the rankings to identify more relevant websites to a user. However, at present the existing link-based algorithms largely determine equivalent rankings differing only on the basis of the weightings which are placed on the numbers of links when determining a web page's importance. Combining such existing measurements would therefore serve little purpose.

An alternative approach is therefore desirable which enables web pages to be ranked based upon criteria other than simple measurements based upon the numbers of links to or from a website.

BRIEF DESCRIPTION OF THE DRAWINGS

Aspects and advantages of the invention will become apparent from the following description of embodiments of the invention with reference to the following drawings in which.

DETAILED DESCRIPTION OF THE DISCLOSURE

Figure 1:
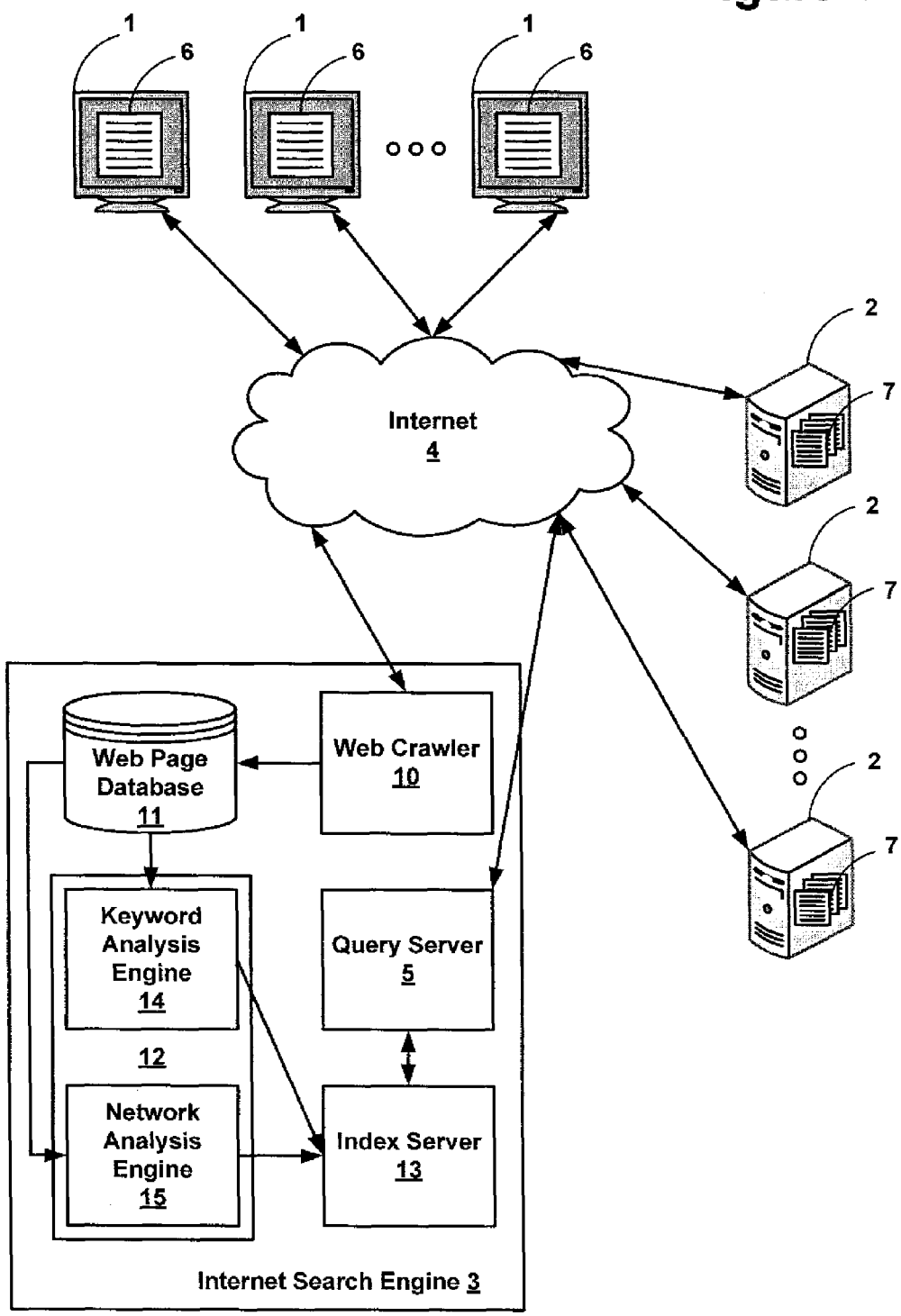
FIG. 1 is a schematic block diagram of a computer network incorporating a search engine in accordance with an embodiment of the present invention.

In accordance with one aspect of the present invention there is provided a method of processing a search query comprising: processing a number of sample web pages to generate network data indicative of the interconnections between the sample web pages as identified by hyperlinks included in the sample web pages; processing the generated network data to determine for each web page a value indicative of the number of hyperlinks in the shortest path between the web page and the other web pages in the sample; generating a ranked index of web pages ranked utilizing the determined values; receiving a search query; and outputting a results list in response to receipt of the search query identifying a number of web pages wherein the results list is ordered on the basis of the ranked index.

In embodiments of the present invention, the value indicative of the shortest path between the web page and the other web pages in the sample can comprise the number of hyperlinks in the shortest path from the current web page to another web in the sample of web pages which has the greatest number of links. Alternatively the value can comprise the number of hyperlinks in the shortest path from another web in the sample of web pages to the current web page which has the greatest number of links. In other embodiments the value could comprise an estimate of the average number of hyperlinks in the shortest path from the current web page to other web pages in the sample of web pages or an estimate of the average number of hyperlinks in the shortest path from other web pages in the sample of web pages to the current web page.

In accordance with another aspect of the present invention there is provided a method of processing a search query comprising: identifying a seed set of web pages containing hyperlinks; utilizing the seed set of web pages to identify a sample set of web pages directly or indirectly linked by hyper links to the web pages of the seed set of web pages; processing the sample web pages to generate network data indicative of the interconnections between the sample web pages as identified by hyperlinks included in the sample web pages; generating a ranked index of web pages by assigning the web pages a ranking on the basis of the closeness of connection of a web page to the web pages in the seed set; receiving a search query; and outputting a results list in response to receipt of the search query identifying a number of web pages wherein the results list is ordered on the basis of the ranked index.

Generating a ranked index of web pages by assigning the web pages a ranking on the basis of the closeness of connection of a web page to the web pages in the seed set could comprise: assigning the web pages in the seed set successive node numbers; assigning each of the web pages in the set of sample web pages a node number successive to the node number assigned to the web pages in the seed set, wherein the node numbers assigned to the web page in the sample set of web pages are assigned in the order in which the sample web pages are retrieved from the Internet; and assigning ranking numbers for the web pages in the seed set of node numbers and the sample set of web pages by considering the web pages in the order of the assigned node numbers and assigning successive ranking numbers to a web page and web pages linked to a web page which have not previously been assigned a ranking number.

Alternatively generating a ranked index of web pages by assigning the web pages a ranking on the basis of the closeness of connection of a web page to the web pages in the seed set could comprise: assigning the web pages in the seed set successive node numbers; assigning each of the web pages in the set of sample web pages a node number successive to the node number assigned to the web pages in the seed set, wherein the node numbers assigned to the web page in the sample set of web pages are assigned in the order in which the sample web pages are retrieved from the internet; assigning ranking numbers for the web pages in the seed set of node numbers and the sample set of web pages by considering the web pages in the order of the assigned node numbers, determining whether a web page has already been assigned a ranking number; and if a web page has not been assigned a ranking number, identifying the web pages linked to the web page under consideration by hyperlinks and assigning the web page under consideration and any other web page linking to the same set of web pages as are linked to by the web page under consideration the next available ranking number.

In accordance with another aspect of the present invention there is provided a method of processing a search query comprising: processing a number of sample web pages to generate network data indicative of the interconnections between the sample web pages as identified by hyperlinks included in the sample web pages; processing the generated network data to determine for each of the web pages a value indicative of the relative proportions of paths between other of the sample of web pages via connections which pass through the web page and paths between other of the sample web pages via connections which do not pass through the web page; generating a ranked index of web pages ranked utilizing the determined values; receiving a search query; and outputting a results list in response to receipt of the search query identifying a number of web pages wherein the results list is ordered on the basis of the ranked index.

In accordance with another aspect of the present invention there is provided a method of processing a search query comprising: processing a number of sample web pages to generate network data indicative of the interconnections between the sample web pages as identified by hyperlinks included in the sample web pages; processing said generated network data to determine for each of said web pages a value indicative of the relative proportions of paths between other of said sample of web pages via connections which pass through hyperlinks associated with said web page and paths between other of said sample web pages via connections which do not pass through hyperlinks associated with said web page; generating a ranked index of web pages ranked utilizing the determined values; receiving a search query; and outputting a results list in response to receipt of the search query identifying a number of web pages wherein the results list is ordered on the basis of the ranked index.

In accordance with another aspect of the present invention there is provided a method of processing a search query comprising: processing a number of sample web pages to generate network data indicative of the interconnections between the sample web pages as identified by hyperlinks included in the sample web pages; processing the generated network data to divide the sample web pages into a number of sets of web pages, each of the sets of web pages comprising web pages having more similar patterns of connections with other web pages in the same set of web pages than web pages in other sets; calculating for each of the sample web pages a value indicative of the extent to which a web page is associated with links connecting web pages in different sets of web pages; generating a ranked index of web pages ranked utilizing the determined values; receiving a search query; and outputting a results list in response to receipt of the search query identifying a number of web pages wherein the results list is ordered on the basis of the ranked index.

In accordance with another aspect of the present invention there is provided a method of processing a search query comprising: processing a number of sample web pages to generate network data indicative of the interconnections between the sample web pages as identified by hyperlinks included in the sample web pages; associating each of the sample web pages with co-ordinate data; updating the co-ordinate data so as to cause the co-ordinate data of web pages connected by hyperlinks to identify co-ordinates closer together and to cause co-ordinate data of web pages which are not connected to each other to identify co-ordinates further apart; calculating for each of the sample web pages a value indicative of the extent to which a web page is associated with links connecting web pages in different sets of web pages on the basis of the Cartesian lengths of the hyperlinks associated with the web page; generating a ranked index of web pages ranked utilizing the determined values; receiving a search query; and outputting a results list in response to receipt of the search query identifying a number of web pages wherein the results list is ordered on the basis of the ranked index.

In embodiments of the invention web pages may be associated with co-ordinate data on the basis of textual analysis of data appearing in a webpage. The association of web pages with co-ordinate data may be such to associate web pages relating to similar subjects with similar co-ordinate values.

In accordance with another aspect of the present invention there is provided a method of processing a search query comprising: processing a number of sample web pages to generate network data indicative of the interconnections between the sample web pages as identified by hyperlinks included in the sample web pages; processing the generated network data to determine for each of the web pages a value indicative of the extent each of the web pages is within a portion of the sample of web pages which are well connected to each other; generating a ranked index of web pages ranked utilizing the determined values; receiving a search query; and outputting a results list in response to receipt of the search query identifying a number of web pages wherein the results list is ordered on the basis of the ranked index.

Processing generated network data to determine for each of the web pages a value indicative of the extent each of the web pages is within a portion of the sample of web pages which are well connected to each other may comprise: utilizing the generated network data to determine for each of the sample web pages, the set of web pages connected to that web page by hypertext links; and calculating for each of the sample web pages a value indicative of the extent to which the web pages in an identified set of web pages associated with a web page are connected to each other.

Alternatively processing the generated network data to determine for each of the web pages a value indicative of the extent each of the web pages is within a portion of the sample of web pages which are well connected to each other could comprise: ordering the sample web pages by the number of hyperlinks associated with the web page; and processing each of the web page in order to associate each of the web pages with a value wherein the value is: indicative of the number of hyperlinks associated with the page, if none of the hyperlinks associated with the web page link to web pages which have previously been processed and associated with a value; or indicative of the greatest number associated with a web page previously processed and associated with a value which is linked to the current web page by a hyperlink where the current web page is linked to at least that number of web pages associated with such a value or which have not yet been processed and associated with a value.

In another embodiment processing the generated network data to determine for each of the web pages a value indicative of the extent each of the web pages is within a portion of the sample of web pages which are well connected to each other could comprise associating web pages linked by at least a threshold number of hyperlinks with a value; and iteratively incrementing the values associated with web pages linked only with web pages associated with values in excess of the current iteration number until no values are updated during an iteration.

In accordance with another aspect of the present invention there is provided an apparatus for generating a ranked index of web pages, the apparatus comprising: a web page data base operable to store a number of sample web pages; a network data generation module operable to process sample web pages stored in the web page data base to generate network data indicative of the interconnections between the sample web pages as identified by hyperlinks included in the sample web pages; a network metric calculation module operable to utilize network data generated by the network data generation module to generate for each of the web pages stored in the web page data store one or more network metrics indicative of the extent to which the interconnections associated with a web page correspond to patterns of interconnections associated with web pages published in order to manipulate the ranking of a web page by a search engine; and a ranking engine operable to use network metrics generated by the network metric calculation module to generate a ranked index of web pages wherein the influence of web pages associated with patterns of interconnections associated with web pages published in order to manipulate the ranking of web pages by a search engine is reduced relative to the influence of web pages which are not associated with such patterns of interconnections.

In accordance with another aspect of the present invention there is provided a method of generating a ranked index of web pages, the method comprising: processing a number of sample web pages to generate network data indicative of the interconnections between the sample web pages as identified by hyperlinks included in the sample web pages; utilizing the generated network data to generate for each of said web pages one or more network metrics indicative of the extent to which the interconnections associated with a web page correspond to patterns of interconnections associated with web pages published in order to manipulate the ranking of a web page by a search engine; and using the generated network metrics to generate a ranked index of web pages wherein the influence of web pages associated with patterns of interconnections associated with web pages published in order to manipulate the ranking of web pages by a search engine is reduced relative to the influence of web pages which are not associated with such patterns of interconnections.

In accordance with another aspect: there is provided a search engine comprising: a web page data base operable to store a number of sample web pages; a network data generation module operable to process sample web pages stored in the web page data base to generate network data indicative of the interconnections between the sample web pages as identified by hyperlinks included in the sample web pages; a network metric calculation module operable to utilize network data to generate for each of said web pages a plurality network metrics indicative of the extent to which the interconnections associated with a web page correspond to defined patterns of interconnections; a ranking engine operable to use network metrics generated by the network metric calculation module to generate a plurality of ranked indices of web pages; and a query server responsive to receipt of a search query including an indication of an index to be utilized to output a results list identifying a number of web pages wherein the results list is ordered on the basis of the index indicated in the search query.

In another aspect there is provided a method of processing a search query comprising: processing a number of sample web pages to generate network data indicative of the interconnections between the sample web pages as identified by hyperlinks included in the sample web pages; utilizing the generated network data to generate for each of said web pages a plurality of network metrics indicative of the extent to which the interconnections associated with a web page correspond to defined patterns of interconnections; using the generated network metrics to generate a plurality of ranked indices of web pages; receiving a search query including an indication of an index to be utilized; and outputting a results list in response to receipt of the search query identifying a number of web pages wherein the results list is ordered on the basis of the index indicated in the search query.

In some embodiments and applications only a single network metric might be used to generate a ranked index.

Thus for example in one embodiment there might be provided a search engine comprising: a web page database operable to store a number of sample web pages; a network data generation module operable to process sample web pages stored in the web page data base to generate network data indicative of the interconnections between the sample web pages as identified by hyperlinks included in the sample web pages; and a network metric calculation module operable to utilize network data to generate for each of said web pages network metric for said sample web pages indicative of the extent to which each sample web page is associated with hyperlinks connecting other web pages which are otherwise poorly connected to most of the rest of the sample of web pages.

In such an embodiment, in order to determine the network metrics for web pages, the network metric calculation module could determine for each of said web pages a value indicative of the relative proportions of paths between other of said sample of web pages via connections which pass through said web page and paths between other of said sample web pages via connections which do not pass through said web page.

Alternatively, the network metric calculation module could determine for each of said web pages a value indicative of the extent to which each sample web page is associated with hyperlinks connecting other web pages which are otherwise poorly connected to most of the rest of the sample of web pages. Such a metric could be calculated by processing generated network data to determine for web pages a value indicative of the relative proportions of paths between other of said sample of web pages via connections which pass through particular hyperlinks and paths between other of said sample web pages via connections which do not pass through those hyperlinks.

In other embodiments the network metric calculation module might calculate a metric indicative of the extent to which sample web pages associated with hyperlinks connecting other web pages which are otherwise poorly connected to each other. This could be achieved by processing stored network data to divide web pages into a number of sets of web pages, each of said sets comprising web pages having more similar patterns of connections with other web pages in the same set of web pages than web pages in other sets; and calculating for the web pages a value indicative of the extent to which a web page is associated with links connecting web pages in different sets of web pages.

An alternative approach would be to associate each web page with co-ordinate data; updating the co-ordinate data to cause the co-ordinate data of web pages connected by hyperlinks to identify co-ordinates closer together and to cause co-ordinate data of web pages which are not connected to each other to identify co-ordinates further apart; and to calculate for each of said web pages a value indicative of the extent to which a web page is associated with links connecting web pages in different sets of web pages on the basis of the Cartesian lengths of the hyperlinks associated with the web page.

In such a system web pages could be associated with initial co-ordinate data on the basis of textual analysis of data appearing in a webpage where web pages relating to similar subjects are associated with similar co-ordinate values.

First Embodiment

FIG. 1 is a schematic block diagram of a computer network in which user terminals 1, web servers 2 and an internet search engine 3 are connected via the internet 4. In use, a user terminal 1 submits a query to an internet search engine 3 via the internet 4. The query is received at the internet search engine 3 by a query server 5. In response to a query, the query server 5 returns a results list 6 to the user terminal 1. The results list 6 comprises a number of hypertext links identifying the web addresses of web pages 7, stored on the web servers 2, which are determined to be of relevance to the query. A user can then download the identified web pages 7 using hypertext links in the results list 6.

In order to generate an appropriate results list 6 in response to a query, the internet search engine 3 must contain, or at least have fast access to, information related to the content of the web pages 7 available on the world wide web via the internet 4. Retrieval, categorization and indexing of the web pages available on the world wide web is performed in advance by the internet search engine 3 using a web crawler 10, a webpage database 11, an analysis engine 12 and an index server 13. Normally, the information is categorized in such a way that web pages 7 with relevant content can be easily identified through the use of key word searching.

In this embodiment, the analysis engine 12 comprises a keyword analysis engine 14 and a network analysis engine 15. The network analysis engine 15 processes the hypertext links included in web pages 7 to identify particular patterns of interconnections between web pages. In accordance with the present invention and as will be described in more detail later, this processing is such to identify motifs, patterns and/or properties of hypertext links between web pages which are then used to rank the web pages 7. By calculating a number of different metrics for a number of different patterns of connectivity web pages can be ranked in a number of different ways. A user can then determine the manner in which pages are ranked by providing to the search engine 3 an indication of the weighting to be place on different metrics when ranking the pages.

In order for the analysis engine 12 to determine rankings for web pages 7, it is necessary for the analysis engine 12 to obtain and process copies of the web pages 7. This is achieved by the web crawler 10 which is a computer program that generates a list of URLs (Uniform Resource Locators) of web pages 7 to be downloaded. The URLs are then utilized to generate download requests which cause copies of the web pages 7 stored on remote web servers 2 to be downloaded and stored in the web page database 11.

When web pages 7 have been stored in the web page database 11, the web pages are then processed and analyzed by the network analysis engine 15 and the keyword analysis engine 14. More specifically, the keyword analysis engine 14 parses the web pages 7 to identify words contained therein and the manner in which words are displayed in the web pages 7. Thus for example keyword analysis engine 14 may determine how many instances of a word there are in a page, their positions on the page and their font size. This processing is then utilized to generate a set of keywords for each page where the keywords are indicative of the content of the page.

As will be described in detail later, the network analysis engine 15 processes the hypertext links contained within the web pages 7 to generate network data. This network data comprises a set of nodes, each associated with an individual web page and a set of links between the nodes where the links correspond to the hypertext links present in those web pages 7. The network analysis engine 15 then utilizes the network data to determine a number of metrics that are indicative of the nature of the interconnections between web pages 7.

Data associating web pages 7 with keywords and ranking data is then stored in an index server 13. Subsequently, when a query is submitted to the internet search engine 3 from a user terminal 1 it is received by a query server 5. Upon receipt of the query, query server 5 parses the search terms contained in the query to produce keywords compatible with the keywords used in the index server 13. These keywords are transmitted to the index server 13 which uses the keywords to identify web pages 7 which contain words which match or nearly match the keywords. The index server 13 then uses other stored information, such as the number of occurrences of a keyword on a page, their position etc., to derive a rank for each web page 6. In accordance with the present invention, this ranking data is determined at least in part using the metrics for web pages 7 generated by the network analysis engine 15. The index server 13 returns to the query server 5 an indication of which web pages 7 match the query, including a rank for each matching web page. The query server 5 then compiles the information received from index server 13 into a ranked results list 6 which is then dispatched to the user terminal 1 that initiated a query.

Structure and Functioning of a Network Analysis Engine

The following describes the structure of the network analysis engine 15, and the manner in which the network analysis engine 15 generates metrics representative of the nature of the interconnections between web pages 7.

Figure 2:
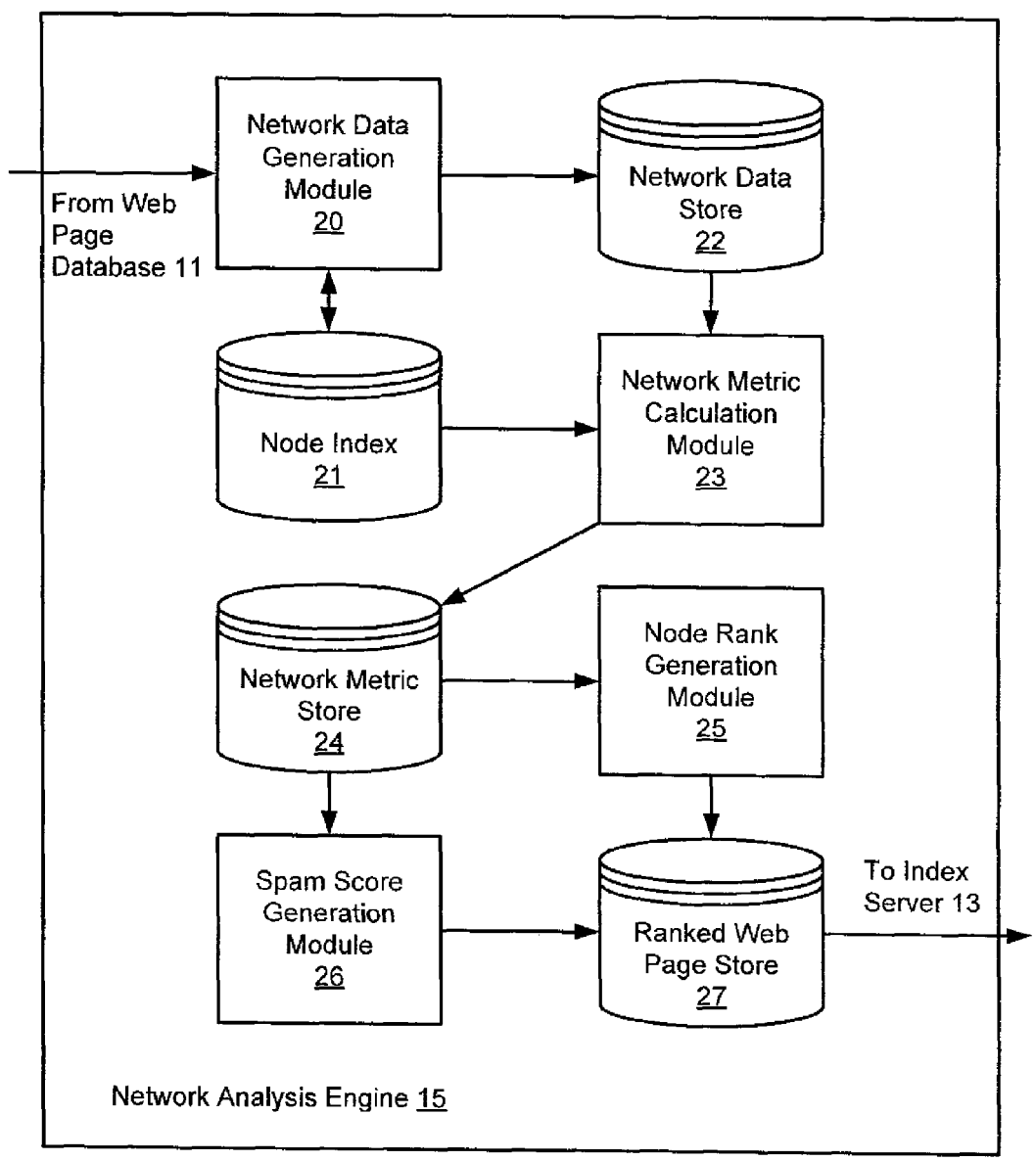
FIG. 2 is a schematic block diagram of the network analysis engine of the search engine of FIG. 1.

FIG. 2 is a schematic block diagram showing a network analysis engine 15 in accordance with an embodiment of the present invention. In this embodiment, the network analysis engine 15 comprises a network data generation module 20 connected to a node index 21 and a network data store 22. As will be described in detail later, the network data generation module 20 retrieves web pages 7 from the web page database 11 connected to the network analysis engine 15 and generates network data representative of the interconnections between the web pages 7. Once generated, the network data is stored in the network data store 22.

The network analysis engine 15 also comprises a network metric calculation module 23 which operates on network data stored in the network data store 22 to generate network metrics which correspond to various metrics related to the interconnections between the retrieved web pages. Once generated, the network metrics are stored in a network metric store 24. The stored network metrics are then used to characterize the nature of the interconnections between web pages 7. The metrics are then utilized to determine a ranking for web pages in response to user search queries.

The processing undertaken by the network analysis engine 15 to generate a number of network metrics and web page rankings will now be described in detail with reference to FIGS. 3-12.

(i) Generation of Network Data

Before characterizing the nature of the interconnections between web pages 7, the web crawler 10 of the internet search engine 3 will have retrieved a representative sample of web pages 7 which are to be indexed. These retrieved web pages will be stored in the web page database 11.

Figure 3:
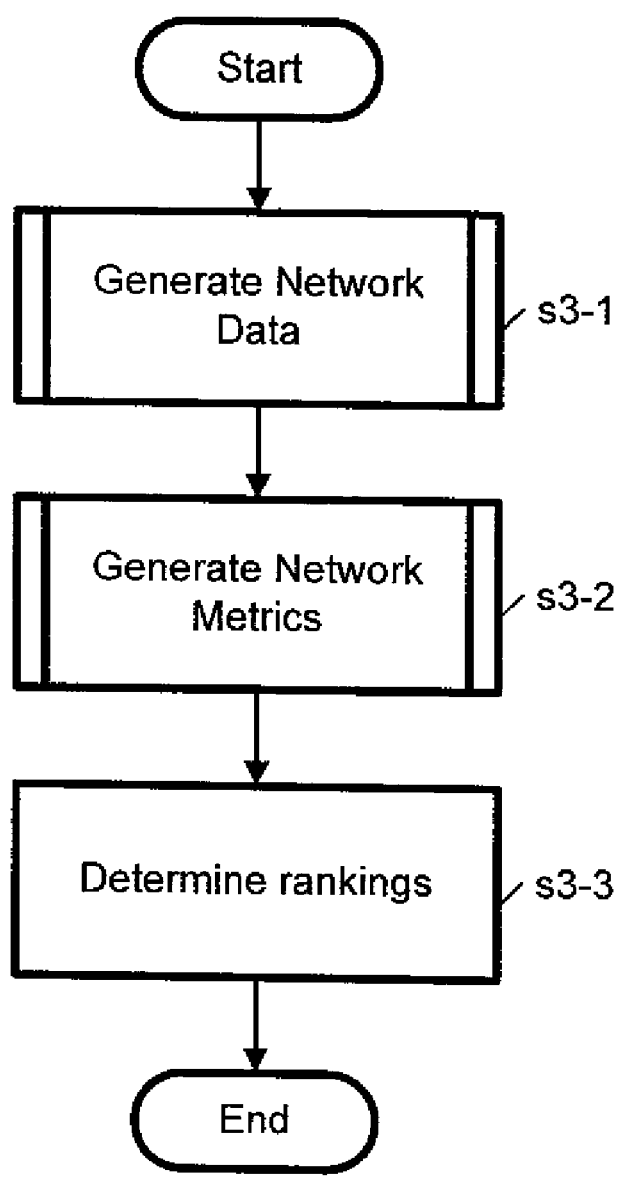
FIG. 3 is a flow diagram showing an overview of the processes performed by the network analysis engine of FIG. 2.

Referring initially to FIG. 3, as a first step, the network data generation module 20 retrieves and processes the stored web pages 7 to generate (s3-1) network data which is then stored in the network data store 22. The generated network data consists of a list of links corresponding to the hypertext links in the retrieved we pages 7. Each link in the list of links comprises data identifying a source node and a target node. The source node represents the web page 7 that contains the hypertext link, and the target node represents the web page 7 identified by the hypertext link.

Figure 4:
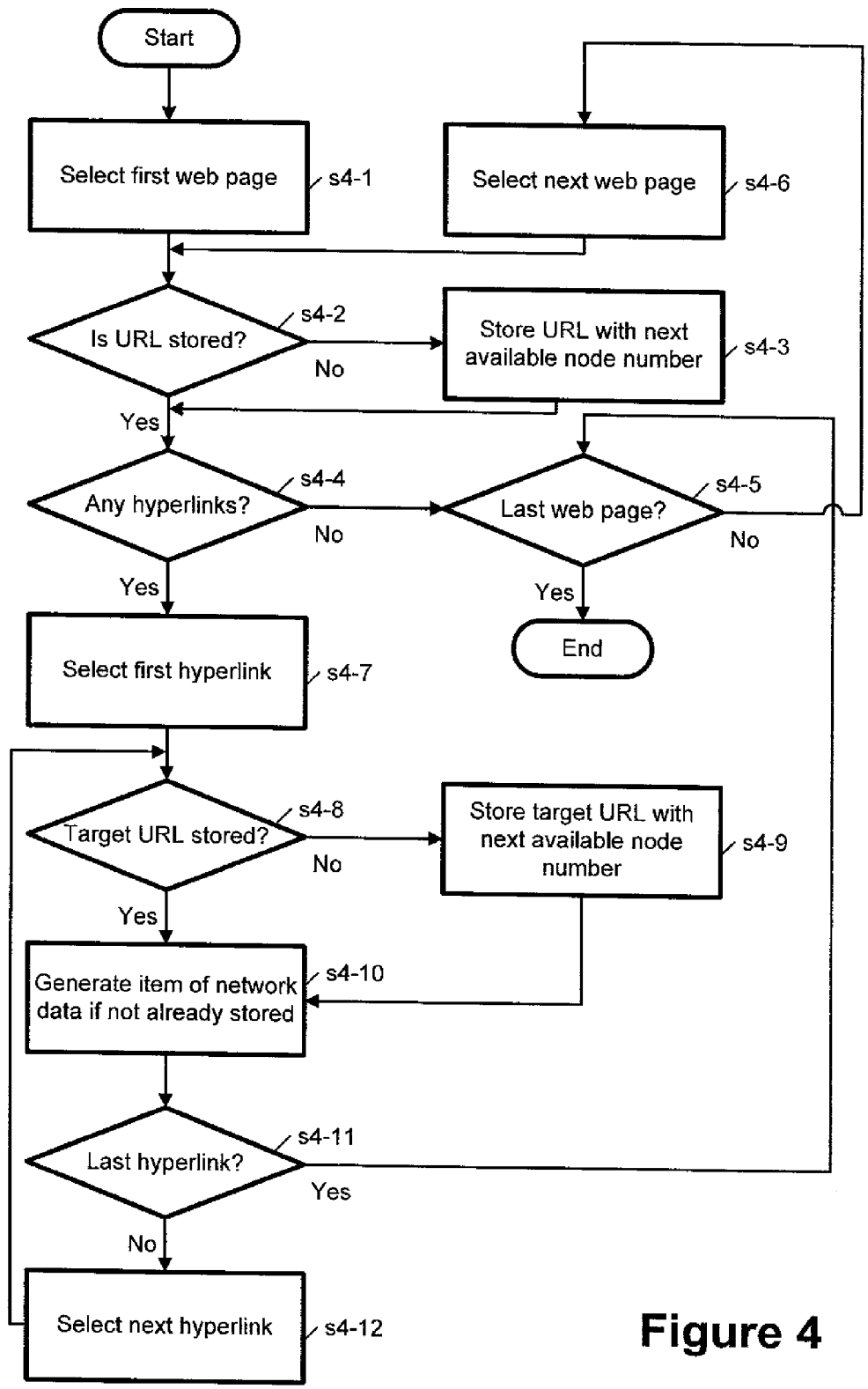
FIG. 4 is a flow diagram showing the processing undertaken by the network analysis engine to generate network data.

Referring now to FIG. 4, this generation of network data by the network data generation module 20 will now be described in greater detail.

Initially (s4-1) after web pages 7 have been stored in the web page database 11 the network data generation module 20 selects a first web page 7 from the web page database 11. The network generation module 20 then determines (s4-2) whether or not the URL of the selected web page 7 is stored in the node index 21.

If the URL is not stored, the network data generation module 20 assigns the next available node number to the URL and stores (s4-3) the URL together with its associated node number in node index 21. After the network data generation module 20 has stored (s4-3) data representing the URL and its associated node number, or alternatively after the network data generation module 20 has determined (s4-2) that the URL has already been stored in the node index 21, the network data generation module 20 proceeds to determine (s4-4) whether or not the web page 7 currently being processed includes hypertext links to other web pages 7.

If the web page 7 currently being processed does not include hypertext links, the network data generation module 20 determines (s4-5) whether or not all of the web pages 7 stored in the web page database 11 have been processed. If all have not been processed, the network data generation model 20 then selects (s4-6) the next unprocessed web page 7 and then proceeds to determine (s4-2) whether the URL for the newly selected web page 7 has already been stored in the node index 21.

If it is determined (s4-4) that the web page currently being processed does include hypertext links, the network data generation module 20 selects (s4-7) the first hypertext link present in the web page 7 being processed. The network data generation module 20 then checks (s4-8) whether the URL of the web page identified by the selected hypertext link has already been stored in the node index 21. If this is not the case, the network data generation module 20 assigns the next available node number to the URL and stores (s4-9) the URL together with its associated node number in node index 21.

After the network data generation module 20 has stored (s4-9) data representative of the URL and its associated node number, or alternatively after the network data generation module 20 has determined (s4-8) that the URL has already been stored in the node index 21, the network data generation module 20 then (s4-10) proceeds to generate an item of network data corresponding to the hypertext link being processed in the network data store 22 if such data has not already been stored in the network data store 22. More specifically, the network data generation module 20 checks whether an item of network data consisting of a pair of numbers has already been stored in the network data store 22. The first of the pair of numbers corresponds to the node number associated with the URL of the web page currently being processed, and the second number corresponds to the node number associated with the URL for the target of the hypertext link currently being processed. If no such item of network data has already been stored, then the network data generation module 20 generates such an item of network data and stores the generated item of network data in the network data store 22.

The network data generation module 20 then checks (s4-11) whether the last hypertext link in the web page 7 currently being processed has been reached. If this is not the case, the next hypertext link in the current web page is selected (s4-12) and the network data generation module 20 determines (s4-8) whether the URL of the web page 7 identified by that hyperlink has been stored in the node index 21 before generating an item of network data for that next hypertext link (s4-9-s4-12) in the same way as has been previously described.

Thus in this way, the network data generation module 20 proceeds to process all of the hypertext links present in a web page 7 and stores an item of network data for each unique hypertext link where the network data comprises a pair of numbers, the first of which indicates the web page 7 containing the hypertext link and the second of which indicates the web page 7 identified by that hypertext link. This processing is then repeated for each of the web pages 7 stored in the web page database 11. Thus the network data generation module 20 enables network data to be generated identifying the connectivity between the various web pages 7 where each of the web pages 7 corresponds to a node in a network and the links between the web pages are identified by the items of network data stored in the network data store 22.

(ii) Generation of Network Metrics

Returning to FIG. 3, after network data representing the connectivity between the retrieved web pages 7 has been generated the network metric calculation module 23 then proceeds to generate (s3-2) network metrics for the web pages 7 based on the stored network data. This processing which occurs for each of the web pages 7 stored in the web page database 11 will now be described in detail with reference to FIGS. 5-12.

Figure 5:
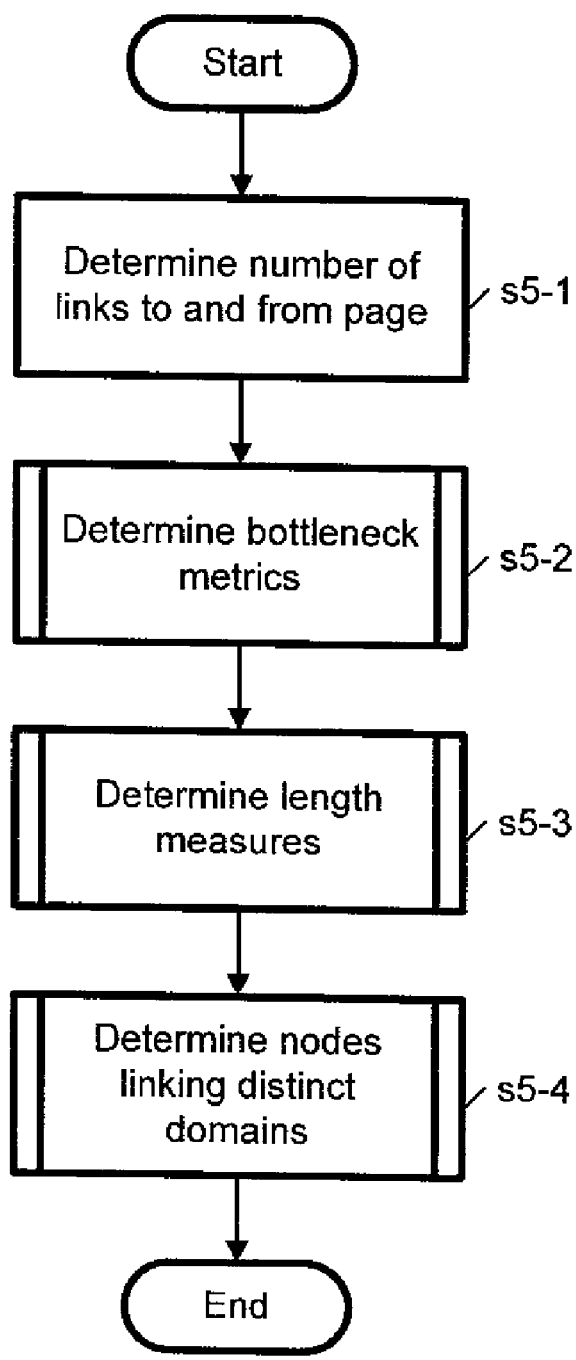
FIG. 5 is a flow diagram showing the processing undertaken by the network analysis engine to generate a number of network metrics.

FIG. 5 is a flow diagram of the processing undertaken by the network metric calculation module 23. In this embodiment, a number of different metrics are generated for each web page 7 stored in the web page database 11. These metrics include measures of the number of links to and from each web page, the extent to which web pages contain links which are of high importance for the connectivity of the web pages being processed and measures of the extent to which web pages contain links connecting web pages 7 relating to different subject matter. These different metrics can then be combined using different weighting to influence the ranking strategy of the search engine 5.

The number of links to and from a web page has long been used to determine a ranking of web pages 7. Conventional ranking schemes such as PageRank™ aim to identify web pages which are seen as authorities, which are linked to by many other web pages 7, or portals, which contain links to many other web pages 7. The applicants have appreciated that metrics based solely upon the numbers of links can be limited in their ability identify the web pages 7 most relevant to a user's query. The applicants have further appreciated that other network measures and combinations of measures can provide a better indication of the relevance of a web page 7 to a user's query. Such other network metrics include the relative importance of a web page for the connectivity of the world wide web or the extent to which a web page 7 links to disparate web pages 7. Thus, in accordance with the present invention, multiple metrics are used to rank web pages 7.

(a) Total Links to and from a Node and Other Authority Measures

In this embodiment as an initial network metric for a web page 7, one or more measures of the numbers of links to or from a web page 7 are determined (s5-1). This can be achieved by counting the number of in items of network data stored in the network data store 22 that contain a particular node number as either the first or the second number. The node index associates each URL with a node number. The number of items of network data stored in the network data store 22 that contain a node number for a particular URL as the first number indicates the number of other web pages which contain hypertext links identifying that URL. Conversely, the number of items of network data stored in the network data store 22 that contain a node number for a particular URL as the first number indicates the number of hypertext links that are contained in the webpage corresponding to that URL which link to distinct URLs.

Various measures of the authority or importance of a web page can then be made. Simple measures can include: the total number of links to a web page; the numbers of pages a webpage links to. This provides a rough indication of the authority or importance of a webpage. Other more sophisticated metrics can be determined by scaling such weights given to individual links based upon the number of links associated with the web pages containing such links.

Thus for example measures similar to those used in the PageRank™ algorithm such as is described in U.S. Pat. No. 6,285,999 could be calculated. In such a system after assigning all web pages an initial ranking value, a page rank value is calculated in an iterative manner by updating the initial value for a page based on the sum of the ranking values for pages referencing the page divided by the number of links in those pages.

More specifically the page rank assigned to a page A referenced by pages B, C, D etc which reference page A is calculated as:

$$PR(A) = \frac{1-d}{N} + d\left(\frac{PR(B)}{L(B)} + \frac{PR(C)}{L(C)} + \frac{PR(D)}{L(D)} + \ldots\right).$$

where PR(u) is the page rank value assigned to webpage u, L(u) is the number of hyperlinks in webpage u, N is the total number of web pages for which the Page Rank values are being calculated and d is a damping factor. The result of such a calculation after a number of iterations approximates the probability of an individual arriving at a particular webpage when randomly following hyperlinks.

Alternatively rather than deriving a ranking value directly from the ranking values of web pages containing hypertext links to a particular web page, a two step process such as the Hyperlink-Induced Topic Search (HITS) algorithm could be used.

In such a system, initially all nodes are assigned a hub and an authority score of 1. These scores are then iteratively updated with each node's authority score being set to be equal to the sum of the Hub Scores for all nodes containing links which point to that node. Nodes hub scores are then updated to be equal to the sum of the authority scores of each node associated the links associated with the node point to. The updated hub and authority scores are then normalized by dividing each hub score by the sum of the squares of all the hub scores and by dividing each authority score by the sum of the squares of all the authority scores. The final hub and authority scores are then those achieved after performing a set number of iterations.

(b) Bottleneck Measurements

A further set of metrics is then determined (s5-2) based upon the extent a web page links to other portions of the world wide web which are poorly connected to other parts of the internet. The applicants have appreciated that such measurements can be indicative of attempts to manipulate metrics based upon the number of connections to a webpage.

Thus, for example, a web designer may attempt to make a webpage appear to be more authoritative by adding multiple web pages to the world wide web with links to the website being promoted. It is, however, unlikely that these additional web pages will themselves have a typical pattern of connectivity to the world wide web. That is, the nature of the interconnections between such web pages 7 is not consistent with the nature of interconnections between web pages 7 that are likely to be relevant to a typical user query.

Network data can be analyzed in a number of different ways to identify web pages which act to link disparate potions of the world wide web where alternative connections between those portions of the world wide web are limited.

Figure 6:
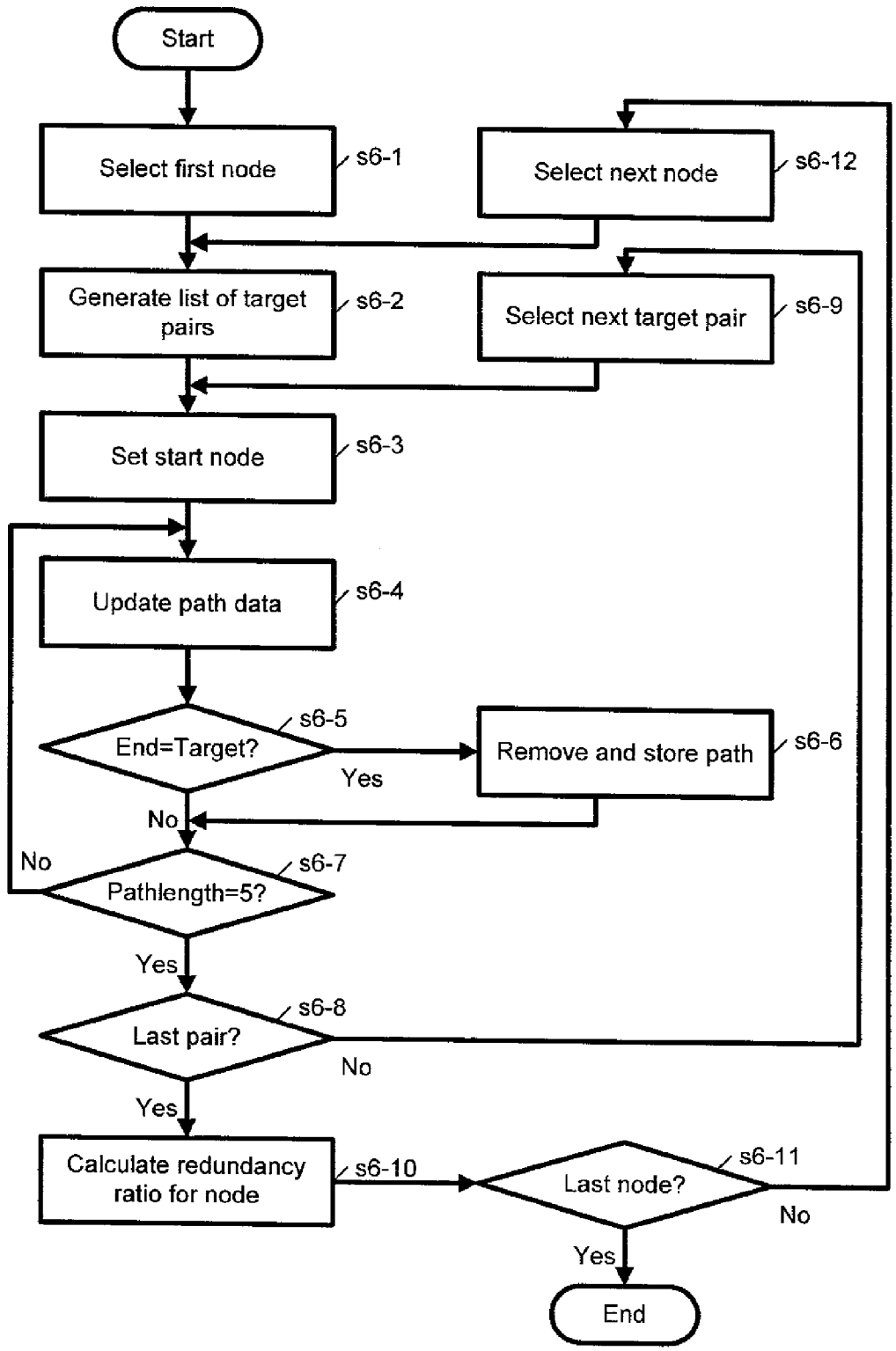
FIG. 6 is a flow diagram showing the processing undertaken by the network analysis engine to generate a network metric relating to the extent to which a web page provides connections to otherwise poorly connected web pages.

One approach to generating such a measure will now be described with reference to FIGS. 6 and 7 which are a flow diagram of the processing of network data and a schematic illustration of a portion of an exemplary network respectively.

In order to identify the extent to which a webpage links disparate potions of the world wide web where alternative connections between those portions of the world wide web are limited, initially the first node number (s6-1) is selected.

Figure 7:
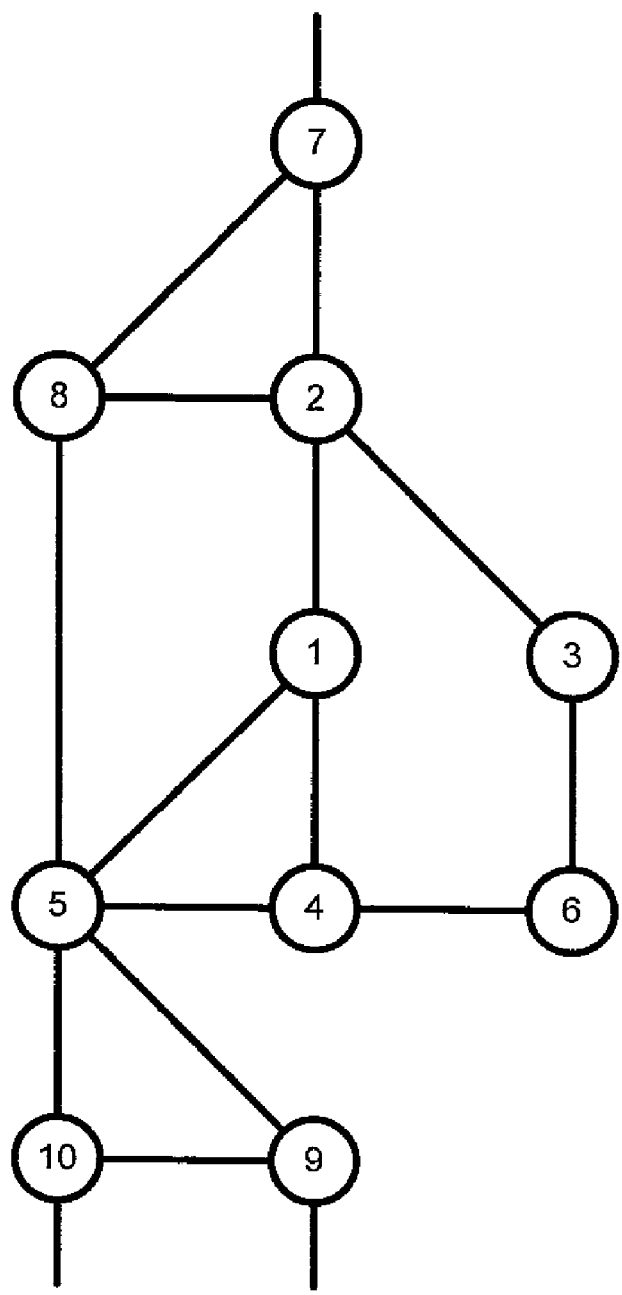
FIG. 7 is a schematic diagram illustrating a portion of a network.

Thus for example, in the illustrative network of FIG. 7 where web pages 7 are indicated by numbers surrounded by circles and hypertext links between web pages 7 are shown as lines between the circles, the network metric calculation module 23 would select (s6-1) for processing the webpage 7 corresponding to node number 1 in FIG. 7.

The network metric calculation module 23 then generates (s6-2) a list of target pairs for the node being processed. Specifically, the network metric calculation module 23 processes the items of network data which include a number corresponding to the node being processed and generates a set of target pairs comprising pairs of distinct node numbers corresponding to the other numbers in each of the identified items of network data.

Thus for example, in the case of the exemplary network of FIG. 7 where the web page 7 corresponding to node 1 is shown as being connected to the web pages 7 corresponding to nodes 2, 4 and 5, the following items of network data including as a first number the number 1 might have been stored [1,2], [4,1], [1,5]. The following list of nodes (web pages) which connect to node 1 could then be identified: [2,4,5]. The network metric calculation module 23 would therefore generate as a list of target pairs the following set of target pairs [(2,4), (2,5), (4,5)].

Once a list of target pairs has been generated, the network metric calculation module 23 then (s6-3) selects the first target pair and sets as a start node the first value in the target pair. The network metric calculation module 23 then generates an initial item of path data comprising a list consisting of this selected start node.

Thus in the case of processing the target pair (2,4) the network metric calculation module 23 would select as a start node the node number 2 and generate a single item of path data comprising the list: [2].

The network metric calculation module 23 then proceeds to process all the currently existing items of path data by taking each of the items of path data in turn. For each item of path data, the final entry in the list of nodes comprising the path data is then identified The item of path data is then replaced by a number of items of path data consisting of the current item of path data to which is appended data representative of the different nodes connected to that node.

Thus, in the case of processing the item of path data consisting of a single entry [2] and the exemplary network of FIG. 7, a list of connections for the node 2, would be determined as nodes [1,3,7,8]. When processing the item of path data [2], this item of path data would therefore be replaced by the following items of path data: [2,1] [2,3] [2,7] [2,8] The network metric calculation module 23 then checks each of the newly generated items of path data and deletes any items of path data which contain any node number more than once. In the case of the above exemplary list of generated items of path data, since none of these contain a node number more than once no items of path data would be deleted.

When all of the existing path data has been updated, the network metric calculation module 23 then (s6-5) determines whether the final entry in any of the newly generated items of path data corresponds to the second value of the target pair currently being processed.

Thus in the case of processing the target pair (2,4) the network metric calculation module 23 would check whether any of the entries in each of the generated items of path data was equal to 4.

If this is found to be the case, the network metric calculation module 23 then removes the identified item of path data from further processing and stores it separately for later consideration (s6-6).

After any items of path data having a final value equal to the second entry in the target pair being processed has been identified and stored, the network metric calculation module 23 checks (s6-7) whether path data having five entries has been generated. If this is not the case, the network metric calculation module 23 then processes the currently existing items of path data in the same way as has previously been described (s6-4 s6-6), generating new items of path data by appending further node numbers to the existing items of path data before checking once again whether the current length of items of generated path data is now equal to five entries (s6-7).

Thus in the case of processing the items of path data described above at the second iteration when processing the target pair (2,4), the following items of path data would be generated: [2,1,4], [2,1,5], [2,3,6], [2,7,8], [2,8,5], [2,8,7] of which the path data [2,1,4] would be identified as ending with the value 4 and stored separately for later processing.

Eventually, the network metric calculation module 23 will determine that path data having five entries has been generated. At this stage, the network metric calculation module 23 will have stored path data identifying every path between nodes identified by the current target pair having no more than five elements.

In the case of processing the target pair (2,4) of the exemplary network of FIG. 7, the following data would therefore have been stored:
[2,1,4], [2,8,5,4], [2,7,8,5,4], [2,3,6,4], [2,8,5,1,4].

The network metric calculation module 23 then (s6-8) checks whether the target pair being processed is the final target pair generated for the current node. If this is not the case, the next target pair is then selected (S6-9) and processed in the same way as the previous target pair (s6-3-s6-8). As a result further path data, identifying paths between the two nodes identified by the next target pair will be generated and stored.

Thus in the case of the example network of FIG. 7, processing the target pair (2,5) would cause the following items of path data to be stored:
[2,1,5], [2,3,6,4,5], [2,7,8,5], [2,8,5], [2,1,4,5].

When the network metric calculation module 23 determines (s6-8) that all generated target pairs for a particular node have been processed, the network metric calculation module 23 then (s6-10) proceeds to use the stored items of path data to calculate a redundancy ratio for the node being processed.

Specifically, the network metric calculation module 23 determines the number of stored items of path data which include the current node being processed relative to the total number of stored items of path data.

Thus in the case of processing node 1 of FIG. 7 where the following path data would be stored: [2, 1,4], [2,8,5,4], [2,7, 8,5,4], [2,3,6,4], [2,8,5,1,4], [2,1,5], [2,3,6,4,5], [2,7,8,5], [2,1,8,5], [4,1,5], [4,5], [4,1,2,8,5].
a redundancy ratio of 5/12=0.42 would be determined.

This value is indicative of the proportion of paths between nodes connected to the node for which the ratio is calculated which pass through that node. Thus in the case of a high ratio value, this will indicate that there are very few paths which can bypass that node and hence that the webpage 7 corresponding to the node is of relatively high importance for the structural integrity of the adjacent portion of the internet.

The value therefore provides an indication of the extent to which a webpage 7 associated with a node number links otherwise unconnected portions of the world wide web. A web page 7 that links otherwise unconnected portions of the world wide web may be more relevant to a user's query under certain circumstances. For example, such a web page 7 may be part of a product review web site and, therefore, may be relevant to user's conducting an internet search with a view to purchasing items over the internet.

After the network metric calculation module 23 has calculated a redundancy ratio for a node corresponding to a webpage, the network metric calculation module 23 checks (s6-11) whether a redundancy ratio has been calculated for all the nodes in the network represented by network data in the network data store 22. If this is not the case, the next node number is selected for processing (s6-12) and a redundancy ratio for that the webpage associated with that node number is determined (s6-2-s6-10) before the network metric calculation module 23 checks once again (s6-11) that redundancy ratios for all the web pages stored in the webpage database 11 have been calculated.

An alternative metric indicative of the extent to which a webpage connects otherwise poorly interconnected web pages can instead be determined by calculating a measure of the extent to which individual hypertext links act to connect disparate portions of the world wide web and then determining a value for a web page 7 based upon the metrics associate with hypertext links included in a web page 7.

Processing to obtain values indicative of the extent a link connects disparate portions of the world wide web can be achieved by modifying the processing undertaken by the network metric calculation module 23 to obtain a measurement of the extent a webpage bridges disparate portions of the world wide web described above.

Figure 8:
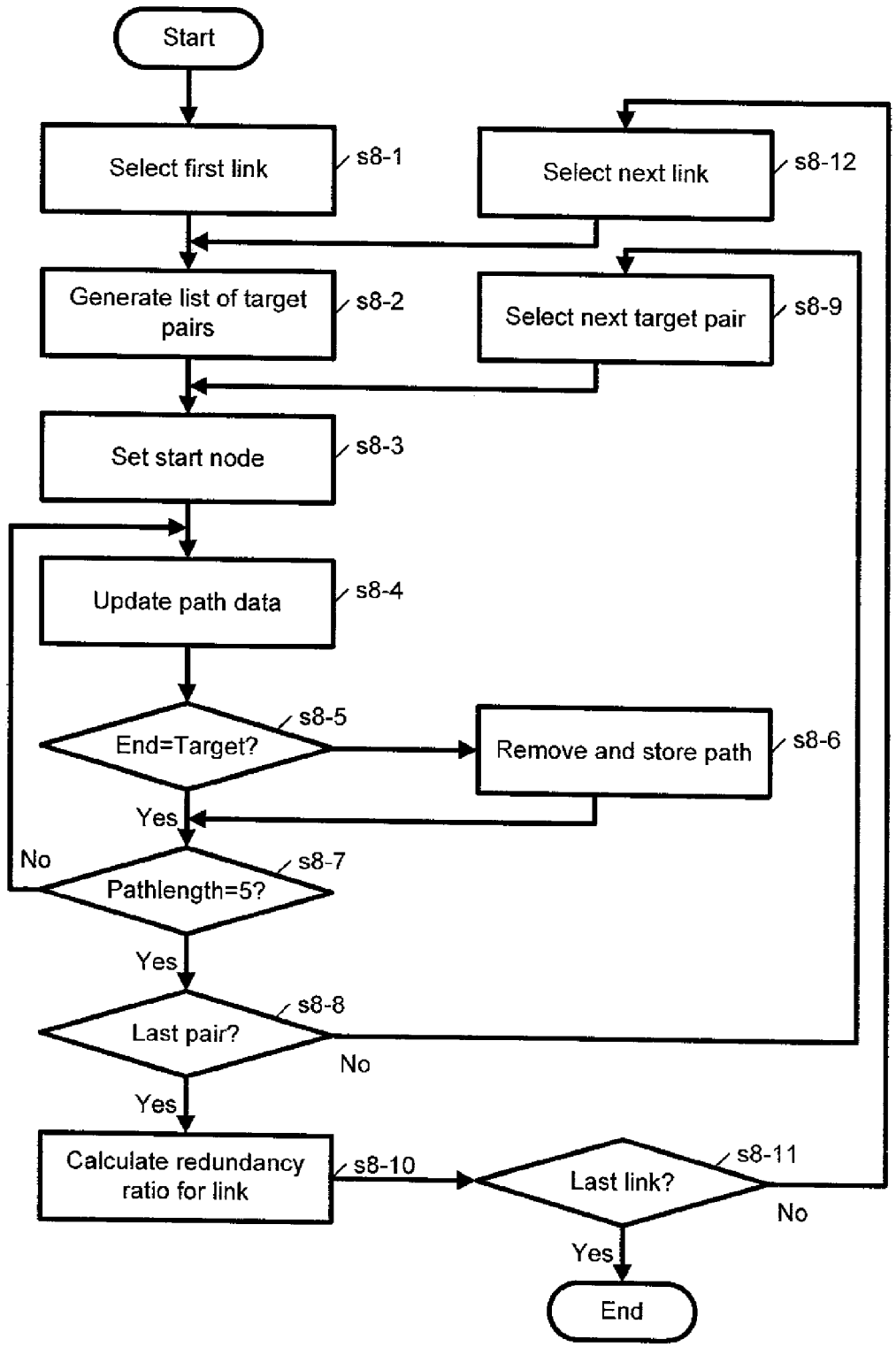
FIG. 8 is a flow diagram showing the processing undertaken by the network analysis engine to generate a network metric relating to the extent to which a web page is connected to links which provide connections to otherwise poorly connected web pages.

This modified processing will now be described in detail with reference to FIG. 8.

When the network metric calculation module 23 is first invoked to determine metrics for the links represented by data in the network data store, a first link (s8-1) is selected. This could be achieved by ordering the items of network data based on the numbers contained in the items of network data. Thus for example processing the network of FIG. 7, the link [1,2] might initially be identified for processing.

The network metric calculation module 23 then generates (s8-2) a list of target pairs in a similar way to the generation of target pairs previously described. However, instead of generating a list of target pairs by identifying connections to a single node, the network metric calculation module 23 generates a set of target pairs based on the connections of both of the nodes identified by the link currently being processed.

Thus in the case of the exemplary network of FIG. 7 processing the link [1,2], the network metric calculation module 23 would identify the nodes connected to the nodes 1 and 2. This would identify the lists: (2,4, 5) and (1,3,7,8). These list would then be utilized to generate the following list of target pairs where each of the entries in each pair are distinct: (2,1) (4,1) (5,1) (2,3) (4,3) (5,3) (2,7) (4,7) (5,7) (2,8) (4,8) (5,8).

After this list of target pairs has been generated for the link being processed, these target pairs are utilized in exactly the same way as has previously been described. That is to say the target pairs are used to generate and store (s8-3-s8-9) a series of items of path data including up to five entries where the head and tail of each list corresponds to a head and tail of one of the target pairs. In this way the network metric calculation module 23 identifies every path of up to four links between each of the nodes connected to the nodes of the link currently being processed.

When path data has been generated and stored for all of the target pairs generated for a particular link, the network metric calculation module 23 then calculates (s8-10) a redundancy ratio for the link. This is achieved in a similar way to the calculation of a redundancy ratio previously described. However in the present case, the network metric calculation module 23, calculates the proportion of stored items of path data which include a pair of numbers corresponding to the link currently being processed.

Thus for example when generating a redundancy ratio value for the link (1, 2) the network metric calculation module 23 determines the proportion of stored of items of path data for a link including within the path data either the entry 2 followed by the entry 1 or the entry 1 followed by the entry 2.

Once a redundancy ratio for a particular link has been calculated, the network metric calculation module 23 then checks (s8-11) whether all of the links in the network have been processed.

If this is not the case, the network metric calculation module 23 then (s8-12) selects the next link for processing and calculates (s8-2-s8-11) a redundancy ratio for that link.

When all of the links have been processed, a redundancy value will be stored for each of the links where a high redundancy ratio values indicates a link within the network which cannot easily be bypassed.

Metrics for individual web pages 7 can then be calculated based upon the values associated with links originating from or connected to that page. Suitable metrics could include the average value associate with such links or a subset of the links such as only the links from a page or to a page or the number of links associated with a page which are above or below a threshold or the greatest or lowest values associated with links connected to a web page.

(c) Identification of Links Between Sub Networks

Returning to FIG. 5, after the network metric calculation module 23 has generated and stored metrics relating to the extent that links and web pages cannot easily be bypassed, the network metric calculation module 23 then (s5-3) proceeds to identify web pages which are associated with links which connect distinct portions of the internet.

The applicants have appreciated that in contrast to web pages which connect to otherwise poorly connected portions of the internet, web pages which connect between multiple different distinct portions of the world wide web are frequently of great relevance to users searching for specific information. In general most hyper-text links connect web pages of related content. This means that the connectivity of web pages relating to the same subject is generally higher than the connectivity between web pages of unrelated content. Where a web page has significant connections between otherwise unconnected domains this suggests that such pages are more likely to be of interest to users. Furthermore it is very difficult to engineer such connections by placing arbitrary web pages on the world wide web as normally web sites relating to different knowledge domains which are not interconnected will be under the control of independent entities. The fact that a web page provides such a bridge is therefore likely to indicate that such links have been made due to the content of a web site or a web page rather than as an attempt to manipulate a ranking by a search engine.

As with the identification of bottlenecks within a network, the identification of links between sub networks can be undertaken in a number of different ways which will now be described with reference to FIGS. 9 and 10 which are a flow diagram of the processing undertaken to identify links between other more interconnected portions of the world wide web and a schematic illustration of a network.

Figure 9:
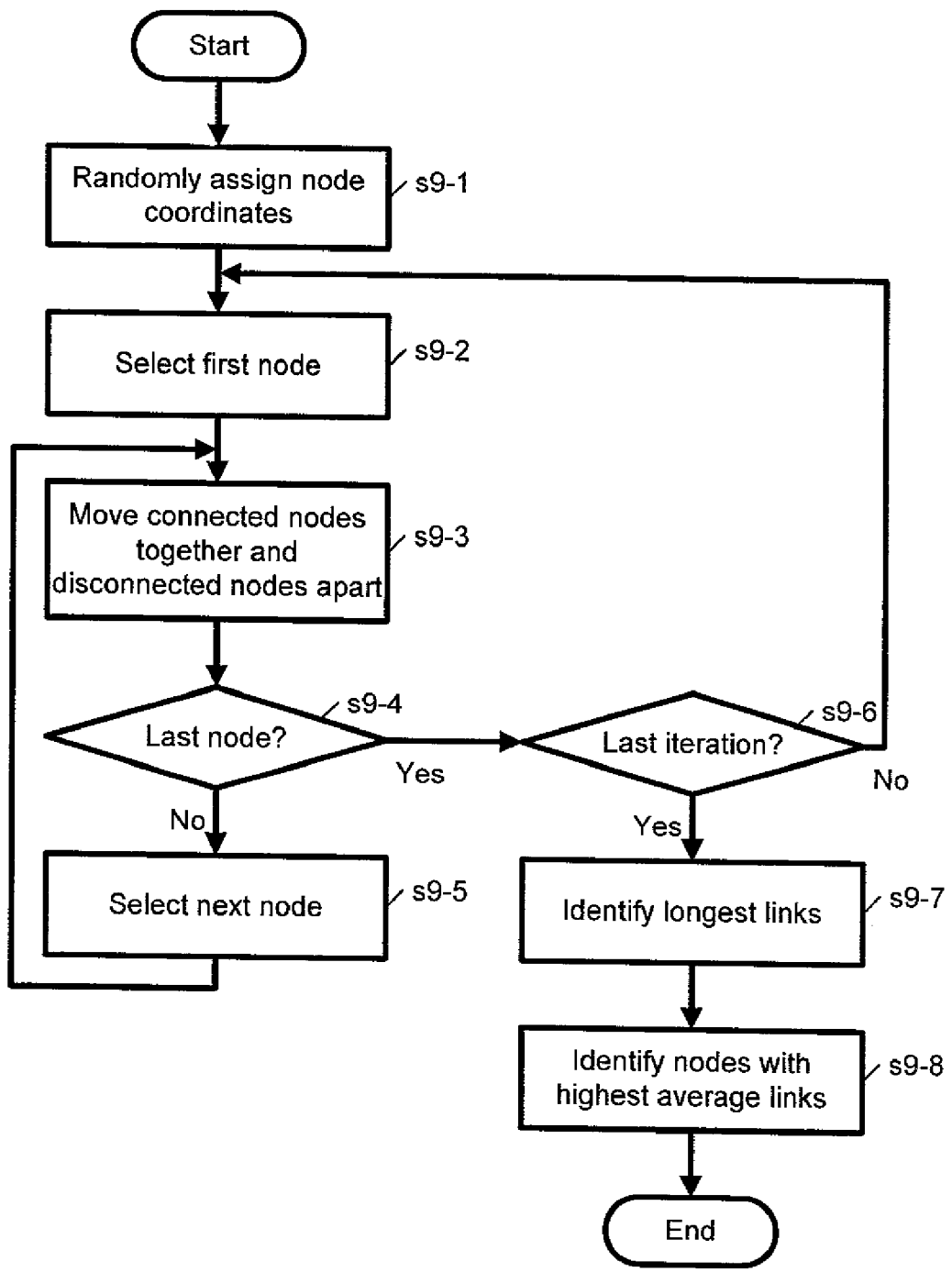
FIG. 9 is a flow diagram showing the processing undertaken by the network analysis engine to generate a network metric relating to the extent to which a web page is connected to links to other web pages which are otherwise poorly connected to each other.

Referring to FIG. 9 in this embodiment in accordance with this method the network metric calculation module 23 initially randomly associates each URL for which data is stored within the node index with a random co-ordinate data (s9-1). In this embodiment for ease of illustration, this co-ordinate data is taken to comprise a pair of two dimensional co-ordinates.

In other embodiments sets of 3 or more co-ordinates could be utilized.

When all the nodes have been randomly assigned a two dimensional coordinate, the first node is selected (s9-2). The network metric calculation module 23 then modifies (s9-3) the coordinate data associated with each of the other nodes for which node data has been stored in the input store utilizing the following equation:

$$(x_n, y_n) \rightarrow (x_n + a, y_n + b)$$

where $$a = \tfrac{1}{2}(x_n - x_p) \text{ and } b = \tfrac{1}{2}(y_n - y_p)$$

if node n is connected to the node currently being processed as represented by data within the network data store 22; and $$a = \tfrac{1}{2}(x_p - x_n) \text{ and } b = \tfrac{1}{2}(y_p - y_n)$$

if node n is not connected to the node currently being processed as represented by data stored in the network data store 22; and $(x_n, y_n)$ and $(x_p, y_p)$ are the co-ordinates associated with node n and the node currently selected for processing respectively.

The effect of updating the co-ordinate data associated with other nodes in this way is to cause the co-ordinate data of connected nodes to be brought closer together and the co-ordinate of unconnected nodes to be moved further apart.

When all of the co-ordinate data for all of the other nodes has been updated the network metric calculation module 23 then checks (s9-4) whether the current node being processed is the last node. If this is not the case the next node is selected (s9-5) as the node to be processed and all the co-ordinate data associated with the other nodes is then updated (s9-3) using the newly selected node before the network metric calculation module 23 checks (s9-4) once again whether the final node has been reached.

Eventually all of the URLs stored within the node index 21 will have been processed and the co-ordinate data updated accordingly. The network metric calculation module 23 then checks (s9-6) whether there have been fifty iterations of co-ordinate data updating.

If this is not the case the first node is selected once again (s9-2) and the co-ordinates of all the nodes are further updated utilizing the updated co-ordinate data.

After fifty iterations of updates have been made, the processing of data will be such as to associate linked nodes with similar co-ordinates and unlinked nodes with different co-ordinates.

Figure 10:
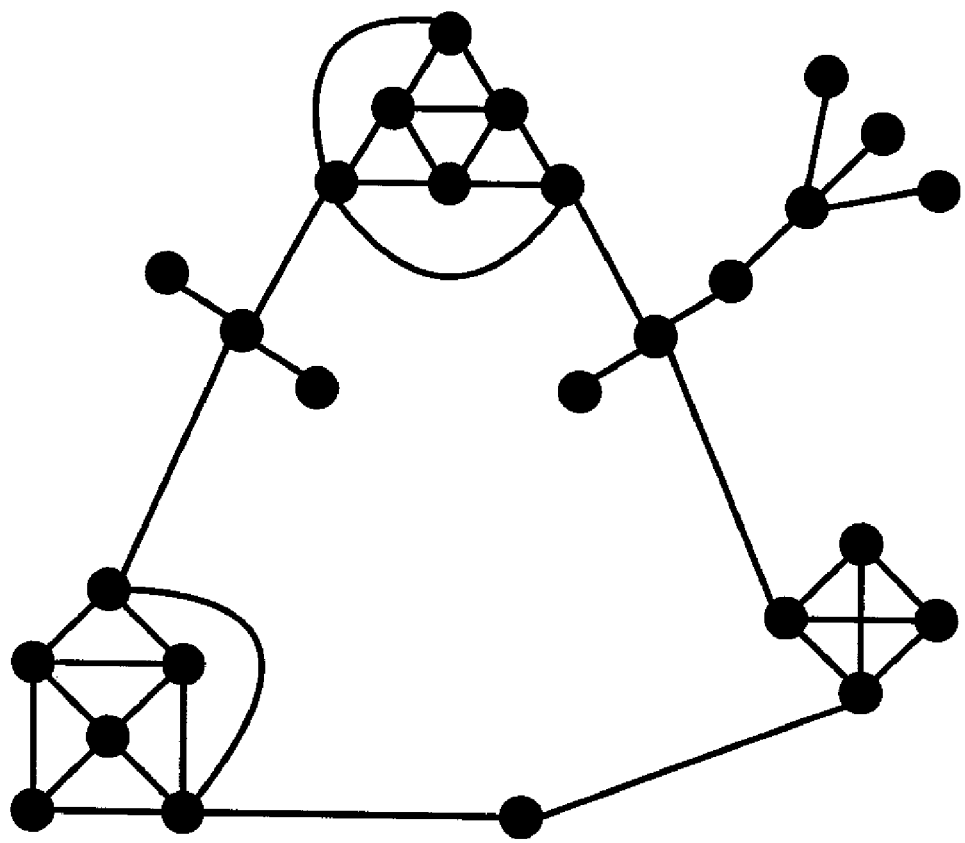
FIG. 10 is schematic diagram illustrating a number of nodes associated with links where node interconnected by links are shown close together and nodes which are not inter connected are shown spread further apart.

FIG. 10 is a schematic illustration of an exemplary network after processing where the positions of the nodes correspond to two dimensional co-ordinates calculated as described with reference to FIG. 9. As can visually been seen in the exemplary illustration of FIG. 10, the network of FIG. 10 is shown as comprising three distinct sub networks which are more interconnected with one another than any other part of a network. These three sub networks are themselves interconnected via three distinct pathways.

Returning to FIG. 9, once the final iteration of co-ordinate updates has been made the network metric calculation module 23 then (s9-7) proceeds to process each link as identified by network data stored within the network data store 22 in turn and determines using the co-ordinate data associated with the nodes corresponding to the link a distance value for each link.

As can been seen from FIG. 10, by identifying the longest links and the nodes associated with them, those nodes and links involved in communicating between sub networks can be identified.

In addition to identifying the longest links and the nodes associated with the longest links, the network metric calculation module 23 also (s9-8) determines for each of the nodes the average length of the links associated with that node and also stores within the network metric store 24 data identifying the nodes associated with the longest average link length. Thus in this way the network metric calculation module 23 is able to generate metrics relating to the extent individual web pages 7 provide connections between otherwise unconnected portions of the internet.

It will be appreciated that in the algorithm just described the identification of interrelated web pages is based solely on the interconnectivity of web pages by hypertext links as represented by the data stored in the network data store 22. Further information about what the distinct portions of the world wide web relate to in terms of semantic content could be determined based on keyword analysis of the web pages. Thus in this way links to specific knowledge domains could be identified and the weights given to links connecting to undesirable content when calculating metrics could be modified to reduce the weights given to such links.

As a further alternative rather than initially assigning co-ordinates randomly to web pages a sample of web pages could be reviewed to identify knowledge domains specific to those web pages. The sampled sites could then be assigned co-ordinate values based on this assessment. Such pre-processing would enhance the extent that the generated length measurements for links are indicative of the extent to which a web page bridges different semantic domains.

(d) Identification of Nodes Linking Distinct Domains

In addition to calculating metrics based on the extent hyper text links bridge web pages in different domains, the data stored in the node index 21 and network data store 22 is also processed by the network metric calculation module 23 to generate metrics indicative of the extent to which the web pages 7 themselves can be allocated to a specific portion of the Internet.

Figure 11:
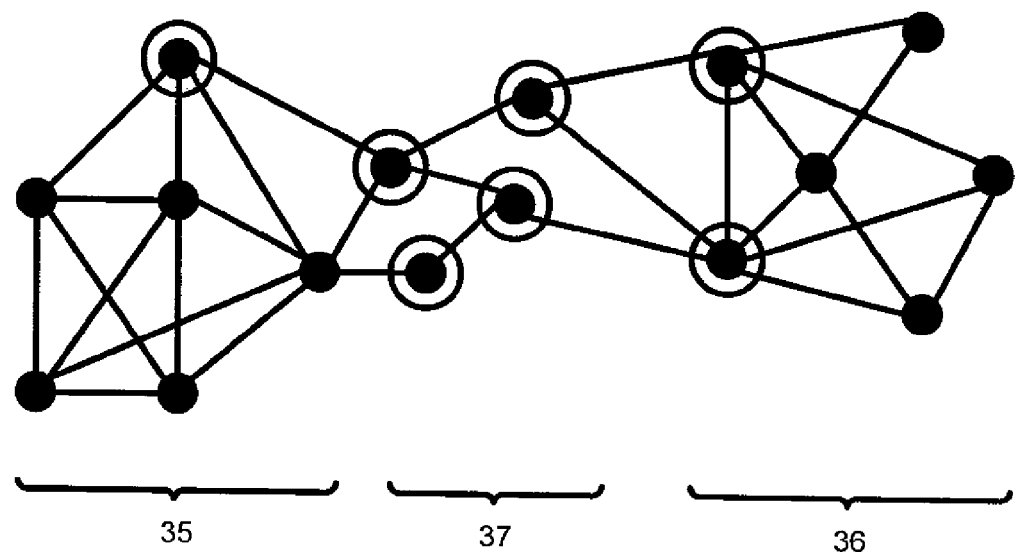
FIG. 11 is schematic diagram illustrating a network of nodes connected with links where a group of nodes provide a bridge between two otherwise unconnected sub networks of nodes.

FIG. 11 is a schematic illustration of a network divided into two sub networks. In this application the term sub network is taken to mean portions of a network comprising nodes that are more connected to one another than other nodes in the rest of the network. Thus in the case of FIG. 11 the left and right hand sections of the illustrated network 35. 36 are examples of sub networks whereas the nodes in the centre of the illustrations 37 are an illustrative example of a bridge between two sub networks. That is to say the nodes shown as highlighted provide a connection between the two sub networks 35, 36.

When network data is representative of web pages and hyper-text links, the existence of sub networks normally indicates a group of web pages relating to a specific subject or group of subjects. Web pages bridging two groups are therefore likely to be web pages discussing multiple subjects. Such web pages where the pages contains links to or from substantially separate sub networks are likely to contain information of interest to multiple groups and hence are less likely to merely be present based as an attempt to manipulate the ranking of a search engine.

Figure 12:
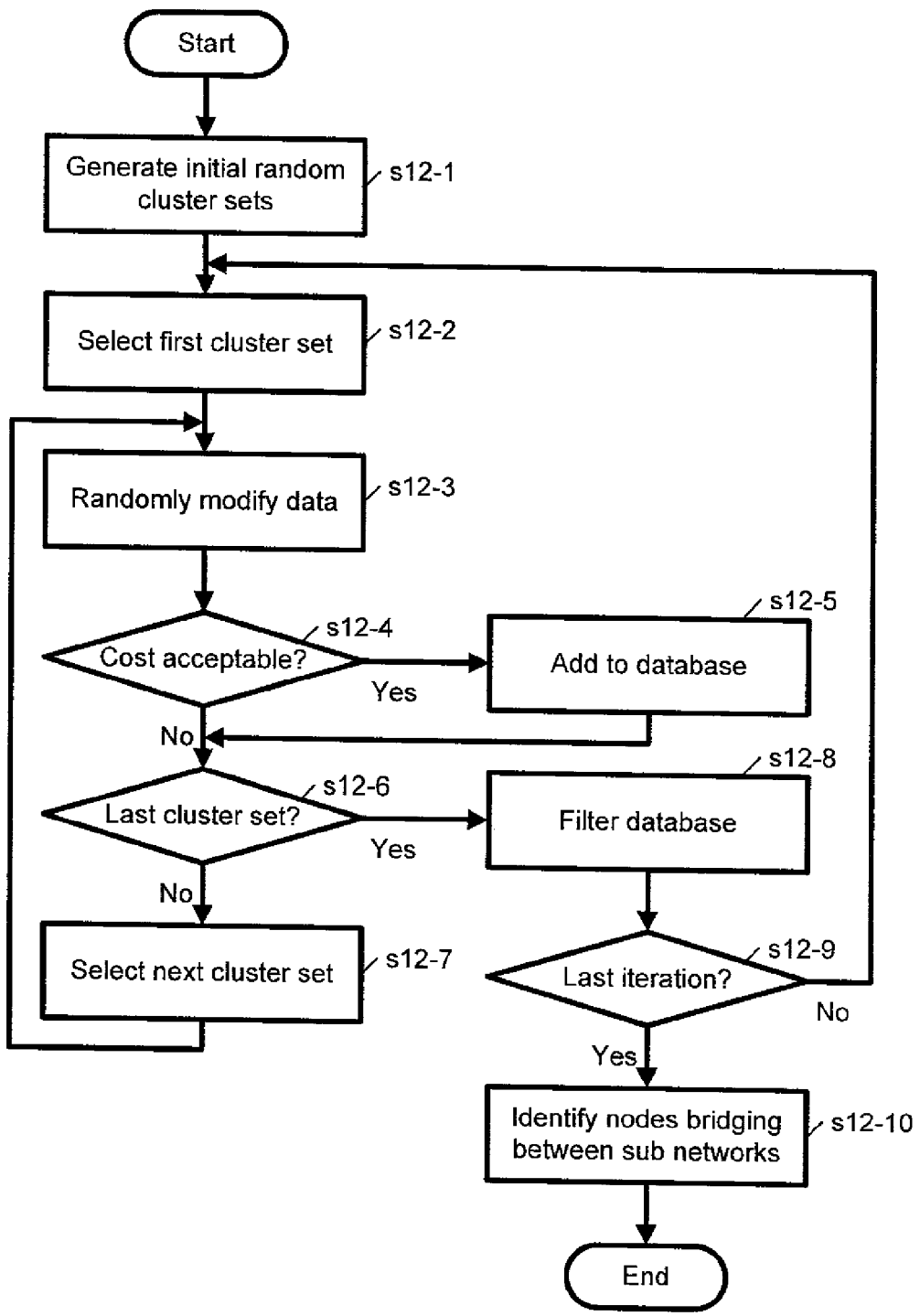
FIG. 12 is a flow diagram showing the processing undertaken by the network analysis engine to generate a network metric relating to the extent to which a web page provides a bridge between two otherwise unconnected sub networks of web pages.

The manner in which the network metric calculation module 23 is arranged to identify web pages connecting different sub networks will now be described with reference to FIG. 12.

In accordance with this first method for identifying links between sub networks, the network metric calculation module 23 initially (s12-1) generates twenty sets of cluster data where each of the nodes is randomly assigned to one of twenty different clusters.

The table below is an illustrative example of twenty sets of cluster data where each of the nodes 1-n has been randomly assigned a cluster value from 1 to 20

|  | Set 1 | Set 2 | ... | Set 20 |
| --- | --- | --- | --- | --- |
| Node 1 | 10 | 9 | ... | 20 |
| Node 2 | 15 | 5 | ... | 1 |
| Node 3 | 12 | 7 | ... | 1 |
| Node 4 | 10 | 9 | ... | 3 |
| ... | ... | ... | ... | ... |
| ... | ... | ... | ... | ... |
| Node k | 9 | 10 | ... | 4 |
| ... | ... | ... | ... | ... |
| ... | ... | ... | ... | ... |
| Node n | 1 | 2 | ... | 5 |

The network metric calculation module 23 then selects the first set of cluster data (s12-2) and randomly modifies (512-3) one of the cluster values for one of the nodes in the selected set.

The effect of randomly amending the value of the cluster associated with a particular node by the set of data can either be to swap the node between the cluster identified by the data previously into the cluster identified by the new value, or alternatively to assign the node to a new separate cluster.

Thus for example processing set 1 of the table above if node 1 is randomly selected for modification changing the cluster value associated with node 1 to 15 will have the effect of placing node 1 in the same cluster as node 2. Conversely by randomly changing the cluster value for the node 1, to say for example 21, node 1 would be placed in a new cluster separate from any of the existing clusters.

After a random modification of the cluster data for the current set has been determined, the network metric calculation module 23 calculates a cost value for the modification compared with cost value for the unmodified set. In this embodiment the cost value is determined using the following equation:

$$\text{Cost} = \Sigma \lambda_1(A_n) + \lambda_2(B_n)$$

Nodes where $A_n$=number of nodes connected to node n in different clusters to node n $B_n$=number of nodes unconnected to node n in the same cluster as node n and $\lambda_1$ and $\lambda_2$ are scaling factors whose relative values are set based on the average connectivity of the stored network.

Thus in this way, where a node is assigned to a cluster which predominately contains nodes which are connected to that node and the cluster does not predominately contain nodes to which the node is not connected, the calculated cost value will decrease. Conversely, if a node is assigned to a cluster which predominately contains nodes that it is not connected to rather than nodes that it is connected to, the cost value will increase.

After cost values for the proposed modification have been determined, the network metric calculation module 23 then (s12-4) determines whether the proposed modification increases the cost associated with the unmodified cluster data being processed by more than 10% of the cost value associated with the unmodified cluster data. If this is not the case, the sub network identification module proceeds to add (s12-5) the modified cluster set data to the cluster set data previously stored.

After either the cost associated with a modified data set has been determined to be more than 10% greater than the cost associated with the unmodified cluster data being processed, or alternatively after data representing the modified data set has been stored by the network metric calculation module 23, the network metric calculation module 23 then (s12-6) determines whether the last of the stored sets of cluster data has been reached. If this is not the case, the next set of cluster data (s12-7) is selected and then modified (s12-3) and a cost is determined for the modified data set (s12-4) and if this cost is acceptable the modified cluster set data is stored (s12-5) before the network metric calculation module 23 determines once again (s12-6) whether the last cluster set has been reached.

As a result of this processing and random modification of the cluster set data, the network metric calculation module 23 will eventually process all the stored cluster set data and will cause to be stored cluster set data for any random modifications which do not result in a cost score 10% greater than the score associated with a cluster set before the cluster set has been randomly modified.

When this has been achieved, the network metric calculation module 23 proceeds to filter (s12-8) the stored sets of cluster data. In this embodiment the filtration of cluster set data is such to eliminate any duplicate sets of data and either all sets of cluster set data associated with a cost value 35% greater than the lowest cost value associated with any of the stored cluster sets, or alternatively to retain only the sets of cluster data associated with the top 100 scores, whichever retains the greatest number of sets of cluster data.

After the stored cluster data has been filtered, the network metric calculation module 23 then (s12-9) determines the number of iterations which have been performed to attempt to identify potential sub networks. If this number is not equal to the maximum number of iterations the network metric calculation module 23 then proceeds to process all of the stored cluster set data (s12-2-s12-8) again before checking once again whether the maximum number of iterations has been reached. In this embodiment, the maximum number of iterations is set to 50.

By randomly modifying the cluster data at each iteration in this way the network metric calculation module 23 causes the sets of cluster data associated with the lowest cost values to be retained.

By virtue of the manner in which the cost values are calculated this will mean that the retained sets of cluster data will be those where the same cluster numbers are associated with nodes which predominately are connected and which are not connected to nodes assigned different cluster numbers.

Ultimately, as result of the processing by the network metric calculation module 23 after the required number of iterations cluster data which most accurately assigns connected nodes to the same clusters and disconnected nodes to different clusters will be stored.

In this embodiment, the network metric calculation module 23 then (s12-10) proceeds to utilize the twenty sets of cluster data associated with the highest score values to identify nodes forming links between sub networks.

Specifically, using each of the sets of cluster data in turn, for each of the nodes the number of connections a node has assigned to different clusters can then be calculated. In the case of nodes involved in connections between different sub networks, this number will be higher than in the case of nodes which do not form part of such connections. Data identifying the number of cross sub network connections for each node is then stored. By identifying the nodes associated with the greatest number of connections to other sub networks, those nodes involved in connecting between sub networks can then be identified Thus for example if the following cluster data were stored:

|  | Cluster No. |
| --- | --- |
| Node 1 | 1 |
| Node 2 | 1 |
| Node 3 | 2 |
| Node 4 | 3 | and node 1 was connected to nodes 2, 3 and 4 an interconnection value of 2 would be stored.

The sum of these values determined for nodes utilizing the sets of cluster data then provide a good indication of the extent to which each node forms part of a connection between sub networks as in general, the nodes for which high values are determined will be the nodes included in such interconnections and this value can be stored in association with the URLs associated with the individual web pages.

(iii) Determining Rankings

Returning to FIG. 3, after the network metric calculation module 23 has generated network metrics for the web pages 7 based on the stored network data (s3-2), the spam score generation module 26 then (s3-3) proceeds to calculate a number of rankings for each of the web pages 7 using the various metrics.

These rankings can be determined in a number of different ways.

Thus for example one ranking might be generated based on a single one of the calculated metrics for example just using a metric calculated in a similar manner to a Page Rank score using the PageRank™ algorithm.

Other rankings could be generated using such a ranking together with different weightings of the other network. In this way a set of different rankings can be generated emphasizing different aspects of the connectivity of web pages.

Thus for example some of the rankings could assign higher weightings to web pages providing connectivity between different portions of the internet whilst other rankings could associate better connected pages with higher rankings than web pages which are identified on the basis of network analysis as being poorly connected to the rest of the internet. These rankings are stored and then be used together with the processing of web pages 7 stored in the web page database 11 undertaken by the keyword analysis engine 14 to generate data for storage in the index server 13.

When a user generates a search query, a set of search terms are input by a user at a user terminal 1 and transmitted from the user terminal 1 to the search engine 3 where they are received by the query server 5. In this embodiment, in addition to the search terms the user terminal 1 is also configured to transmit a user selection of which of the different stored sets of ranking data is to be utilized to generate a results list 6. When the query server 5 receives a search request from a user terminal 1, the query server 5 then proceeds to generate and return an appropriate results list 6 to the user terminal 1 using the selected set of rankings. Thus in this way the user can tailor their search strategy by selecting which set of rankings are to be utilized to perform a search and hence vary the emphasis placed on different aspects of patterns of connection associated with a web page in determining a results list 6.

Second Embodiment

A second embodiment of the present invention will now be described in which a network analysis engine utilizes network data to generate metrics to determine for a webpage a score indicative of the extent to which the pattern of hypertext links associated with a page corresponds to patterns which may be indicative of an attempt to manipulate search engine ranking systems. Once generated, the network metrics are stored in a network metric store 24. The stored network metrics are then used to calculate rank data and a spam score for each of the web pages 7. This rank data and spam score for each webpage is then stored and can be utilized to a ranking for web pages in response to user search queries where the ranking of web pages which appear to be attempts to manipulate the rankings are penalized either by being eliminated from the results or by reducing the rankings for such websites.

Figure 13:
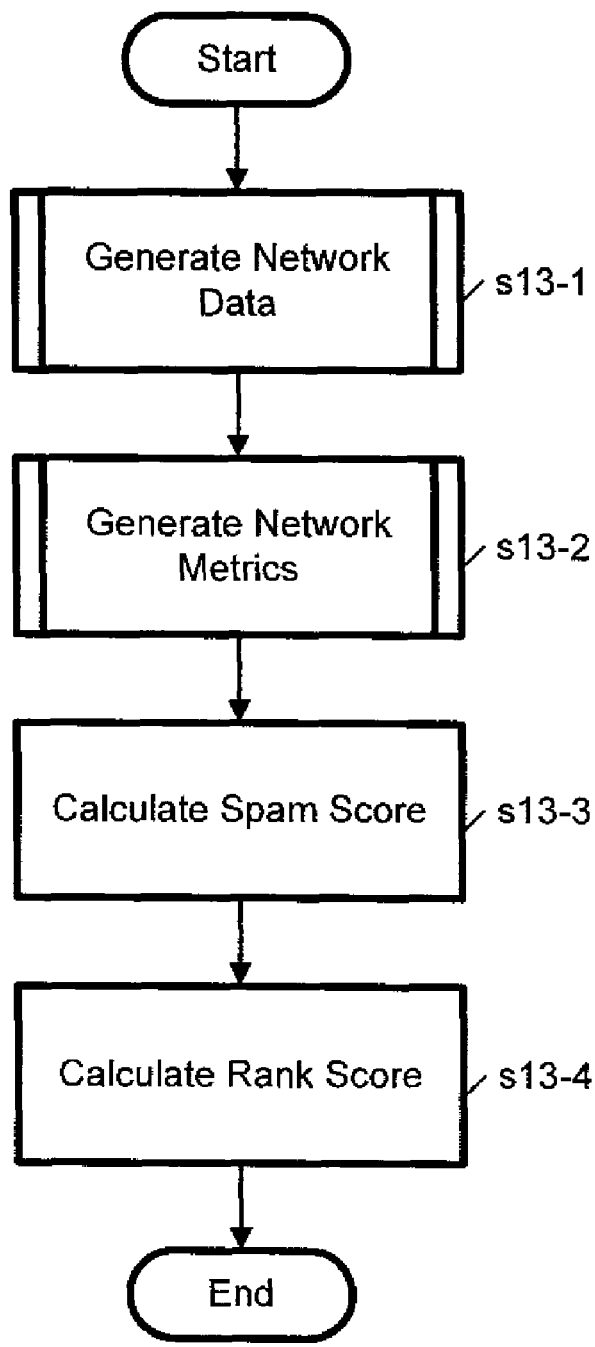
FIG. 13 is a flow diagram of processing undertaken by a network analysis engine to identify attempts to influence rankings of web pages and reduce the influence of such attempts in the generation of results lists.

FIG. 13 is a flow diagram of the processing undertaken by a network analysis engine 3 in accordance with the present embodiment.

Initially the generation of network data (s13-1) and the calculation of network metrics s13-2) is undertaken in the same way as has previously been described in relation to the first embodiment.

The applicants have appreciated that metrics based solely upon the numbers of links are only poorly able to identify spam the web pages present solely for the purpose of manipulating a ranking algorithm. The applicants have further appreciated that other network measures and combinations of measures can provide a better indication of whether a web page 7 aims to manipulate a ranking algorithm and additionally metrics measuring such connectivity are difficult to manipulate. Such other network metrics include the relative importance of a web page for the connectivity of the world wide web or the extent to which a web page 7 links to disparate web pages 7. Thus, in accordance with the present invention, multiple metrics are used to identify suspect web pages 7 and reduce the influence of such web pages 7 in a generated ranking score.

Having generated network metrics for the web pages 7 based on the stored network data (s3-2), the spam score generation module 26 then (s3-3) proceeds to use the various metrics to calculate a score indicative of the extent that the individual web pages are associated with patterns of connectivity associated with web pages published to manipulate search engine rankings.

As has been discussed above the various metrics generated by the network metric calculation module 23 are indicative of different aspects of the connectivity between web pages. The number of links to and from a page is an approximate measure of the importance or authority of a web page. However such a measure can be manipulated by publishing additional web pages with links to pages which are to be promoted. The other network metrics can provide measures of the extent to which such attempts at manipulation are occurring as the connectivity of the additional web pages to the rest of the internet tends to be poor. Further these additional web pages are less likely to link between different distinct knowledge domains in the internet as they are usually have limited semantic content and hence independent third parties are unlikely to link their websites to such additional pages.

Thus a measure of the extent to which a web page is associated with patterns or motifs of connectivity associated with the presence of attempts to manipulate a search engine ranking These rankings can be calculated based on a function of the calculated network metrics. It will be appreciated that many suitable functions exist which sum or scale the various different metrics to obtain a suitable value.

After the spam score generation module 26 has determined a score for each of the web pages stored in the web page data base 11, the node rank generation module 25 then (s3-4) calculates a rank score for each of the web pages 7. In this embodiment this is determined based on the number of links associated with a web page different ways. Thus for example one ranking might be generated in a similar manner to the calculation of a Page Rank using the PageRank™ algorithm. However, in order to improve the quality of such rankings, the algorithm is modified so that the weighting given to links to web pages associated with spam scores indicative of a web page being with patterns or motifs of connectivity associated with the presence of attempts to manipulate a search engine being reduced. The calculated rankings are the stored in the ranked web page store 27

When a user generates a search query, a set of search terms are input by a user at a user terminal 1 and transmitted from the user terminal 1 to the search engine 3 where they are received by the query server 5. In this embodiment, in addition to the search terms the user terminal 1 is also configured to transmit a user selection of which of the different stored sets of ranking data is to be utilized to generate a results list 6. When the query server 5 receives a search request from a user terminal 1, the query server 5 then proceeds to generate and return an appropriate results list 6 to the user terminal 1 using the selected set of rankings in the ranked web page store 27 are calculated in such a way as to reduce the influence of links associated with web pages 7 with patterns of connectivity which arise due to attempts to manipulate search engine ranks, the results list 6 should associate such web pages with lower rankings and hence provide more reliable information to a user.

Other Network Metrics for Assessing Web Pages

A number of further network metrics which have been found to correlate well with user perceptions of relevance or which are useful to identify attempts to manipulate search engine rankings will now be described. It will be appreciated that in further embodiments of the present invention any of these metrics could be utilized to determine the ranking of web pages.

As in the previous embodiments initially network data is generated associating web pages 7 with node numbers and hyperlinks between web pages with network data for each unique hypertext link where the network data comprises a pair of numbers, the first of which indicates the web page 7 containing the hypertext link and the second of which indicates the destination webpage identified by the hyperlink.

(i) Distance Measures for the Shortest Paths from or to a Node

An indication of how well connected a web page is to the rest of the world wide web can be determined by considering the average or the maximum shortest distance to or from all nodes which are connected to a particular node. In this context distance means the smallest number of links that have to be traversed to link between two web pages. As hyperlinks are directional these measures will differ depending upon whether the measure is based upon the value for the smallest number of links to be traversed when starting from a particular node or when considering paths which end at a particular node.

Where a web page is poorly connected to the rest of the worldwide web this may result in particularly high values because of the limited connection of a web page to the rest of the world wide web or particularly low values because only a small subset of web pages are connected to the web page of interest by any means. Thus either very high or very low values may indicate that a web page is unlikely to be of relevance or alternatively the web page is an attempt to manipulate a search engine ranking.

It will be appreciated that when calculating a maximum shortest distance based on network data, it is necessary to calculate shortest distance values for all nodes in a network. However, a reasonable approximation of an average shortest distance value can be obtained just by determining values for a sample of nodes. The appropriate size of the sample will depend up the level of connectivity of the network in question.

(ii) Centrality and Connectivity Measurements

A further potential metric for measuring the relevance and likely importance of a webpage is to determine the extent that a webpage is within a tightly connected portion of the world wide web. Such a measure enables poorly referenced web pages to be identified which themselves are unlikely to be of interest.

A simple approach to obtaining a centrality measurement is to determine the extent to which web pages linking or linked to a particular web page are themselves interconnected. This can be achieved by identifying the links associated with a particular node to identify a set of nodes of interest. The extent that links exist between the nodes in the set can then be calculated. If the number of interconnected nodes is high relative to the total number of possible interconnections, this then indicates that the original node is in a portion of the world wide web which is highly interconnected which suggests that the web page associated with a node is at the centre of a group of nodes concerned with the same subject matter.

A problem with the simplistic approach is that web pages which only link within a distinct group of pages and not at all or very little to the rest of the world wide web score highly.

More sophisticated algorithms can provide measures of the centrality of a web page within a network of linked pages which reflect the extent to which all web pages in a neighborhood are themselves well connected to the world wide web.

Thus for example initially all nodes in a network could be ordered by the number of links to or from a page associated with an associated web page. All web pages associated with only one link could be assigned a value of 1 indicating that such pages are at the periphery of the network.

Those web pages associated with two links would then be examined and assigned a value of 1 if either of the pages linked to has already been associated with a value 1 or a value 2 otherwise.

The remaining web pages would then be processed in turn based on the ordered list ordered by the number of links associated with a page. For each page, the page could assigned a ranking value N being the highest number for the number of links to pages assigned already assigned a value of N or for which no value had yet been assigned.

Thus for example when processing web pages having 3 links, those pages linking to pages previously assigned a value of 1 would themselves be assigned a value of one, those pages linking only to web pages previously assigned a value 2 would themselves be assigned a value of 2 whereas web pages with 3 links to or from only pages assigned the value of 3 or not yet assigned a value would be given a ranking value of 3.

In this way web pages would be assigned a ranking value indicative of the extent that a web page was well connected to pages which themselves are well connected. Poorly connected and poorly referenced pages are most likely not relevant or alternatively attempts to manipulate a search engine ranking. In contrast, web pages well referenced by other well referenced web pages are likely to be authoritative.

An alternative approach to identifying well connected and well referenced web pages would be to start by associating all web pages associated with three or more links to 1. The values associated with web pages could then be updated by iteratively incrementing the value associated with a web page by one at each iteration where the web page was linked only to other web pages associated with a value equal to or higher than the current iteration number and repeating this process until the values of no pages where being increased in the course of an iteration. Assigning a value to web pages in such a way results in a similar ranking of web pages to that using the previously described approach with poorly connected and poorly referenced web pages being assigned a low value and well referenced web pages referenced by similarly well connected web pages being associated with a high value.

(iii) Renumbering Algorithms

An another approach is to utilize the fact that the initial web crawl for identifying web pages on the world wide web is triggered by an initial set of seed web pages. More specifically, it can be reasonable to assume that the initial seed set of web pages are reliable sources of information. If this is the case then the fact that other web pages are referenced by such pages provides some reassurance that those web pages are themselves reliable sources of information.

A simple ranking based on this approach can be achieved by reordering the node numbers assigned to web pages so that web pages are assigned node numbers similar to those of the web pages which reference them. Thus each webpage is considered in turn based on the order in which the web pages where retrieved by the web crawler. The first retrieved web page is assigned the value 1 and those web pages referred to by that page are then assigned the next available node numbers. This is then repeated for each retrieved webpage which has not previously been assigned a new reference number in the order that they appear in the web page database 11.

By processing the nodes in the starting with the initial assignment of node numbers the higher values will be assigned to web pages less directly connected to the seed web pages and hence potentially to less reliable sources of information.

Another approach would be to assign all nodes with identical connections the same value. This would not assign unique values to each node, but again where the assignment of values was linked to the initial retrieval order, based on the assumption that the initial seed set of web pages utilized to generate network data, assigning the same value to nodes have the same pattern of connections and doing so based on the order of retrieval of web pages would be such to assign similar low values to nodes closely connected to the initial seed nodes and hence web pages which have identical patterns of connection to web pages which are assumed to be reliable.

Further Modifications and Embodiments

Although in the above described embodiment various specific parameters such as the numbers of iterations used to generate various network metrics have been identified, it will be appreciated that in other embodiments different parameters could be utilized. It will also be appreciated that various different functions could be used to calculate alternative metrics for use in the present invention. It will also be appreciate that other measurements which are indicative of specific patterns of connectivity could be determined in addition or as alternatives to those described in detail.

Although in the above described embodiment a number of different network metrics are described as being calculated, it will be appreciated that in other embodiments only an individual metric or a limited subset of the metrics might be used. In other embodiments different combinations of metrics might be used. It will also be appreciated that when calculating metric values for a webpage limited sets of links might be used to calculate metric values such as basing values solely on inward or solely on outward links.

The above embodiments describe generating a single item of network data representing the presence of one or more hyperlinks between two web pages. In other embodiments an item of network data could be generated for each hyperlink instead. In such an embodiment where a web page contained multiple hyperlinks to another web page multiple items of identical network data would be generated. Network metrics could then be generated utilizing this data in a similar way to the metrics described above.

Although in the above described embodiment metrics for a web page are described as being based on the connections to or via a particular web page, it will be appreciated that further metrics could be calculated based on values calculated for web pages to or from which a page connects. Thus for example in such an embodiment a web page might be associated with a high spam score because it is connected to other web pages which themselves are associated with high spam scores.

Although in the above described embodiment system is described in which a results list is returned in response to a user query, it will be appreciated that the system could be utilized to return a set of metrics or rankings in response to receiving data identifying a specific website. Such data could be in the form of a set of network metrics or could identify one or more ranking values for a website associated with specified search terms.

It will also be appreciated that in embodiments of the present application rather than providing an indication of which of a umber of indices are to be used to generate a response to a search query, in the absence of an indication a default index could be used.

Although in the above described embodiment the spam scores generated by the spam score generation module are utilized to modify weightings involved in the calculation of rankings by the node rank generation module 25, it will be appreciated that the spam scores could be utilized in other ways.

Thus for example rather than using the spam scores to reduce the influence of web pages associated with patterns of connectivity associated with publication of web pages to influence a search engine ranking when calculating the rankings for storage in the ranked web page store 27, the spam scores could be utilized to modify rankings when processing a query and generating a results list 6. Further rather than using the spam scores to modify weighting of links to and from web pages when the calculation of rankings, in other embodiments a ranking of web pages could be calculated and then the rankings of web pages associated with spam scores indicative of attempted manipulation of search engine rankings could then be reduced.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier can be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means. When a program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

The invention claimed is:

1. A method of processing a search query comprising:
   processing a number of sample web pages to generate network data indicative of the interconnections between the sample web pages as identified by hyperlinks included in the sample web pages;
   utilizing the generated network data to generate for each of said web pages a plurality of network metrics indicative of the extent to which the interconnections associated with a web page correspond to defined patterns of interconnections;
   using the generated network metrics to generate a plurality of ranked indices of web pages;
   receiving a search query including an indication of an index to be utilized; and outputting a results list in response to receipt of the search query identifying a number of web pages wherein the results list is ordered on the basis of the index indicated in the search query.

2. The method of claim 1, wherein if a search query does not include an indication of an index to be utilized, a results list is output in response to receipt of the search query wherein the results list is ordered on the basis of a default index.

3. The method of claim 1 wherein utilizing the generated network data to generate network metrics comprises generating at least one network metric for said sample web pages indicative of the extent to which each sample web page is associated with hyperlinks connecting other web pages which are otherwise poorly connected to most of the rest of the sample of web pages.

4. The method of claim 3 wherein generating at least one network metric for said sample web pages indicative of the extent to which each sample web page is associated with hyperlinks connecting other web pages which are otherwise poorly connected to most of the rest of the sample of web pages comprises: processing said generated network data to determine for each of said web pages a value indicative of the relative proportions of paths between other of said sample of web pages via connections which pass through said web page and paths between other of said sample web pages via connections which do not pass through said web page.

5. The method of claim 3 wherein generating at least one network metric for said sample web pages indicative of the extent to which each sample web page is associated with hyperlinks connecting other web pages which are otherwise poorly connected to most of the rest of the sample of web pages comprises: processing said generated network data to determine for each of said web pages a value indicative of the relative proportions of paths between other of said sample of web pages via connections which pass through hyperlinks associated with said web page and paths between other of said sample web pages via connections which do not pass through hyperlinks associated with said web page.

6. The method of claim 1 wherein utilizing the generated network data to generate network metrics comprises: generating at least one network metric for said sample web pages indicative of the extent to which each sample web page is associated with hyperlinks connecting other web pages which are otherwise poorly connected to each other.

7. The method of claim 6 wherein generating at least one network metric for said sample web pages indicative of the extent to which each sample web page is associated with hyperlinks connecting other web pages which are otherwise poorly connected to each other comprises:
processing said stored network data to divide said web pages into a number of sets of web pages, each of said sets of web pages comprising web pages having more similar patterns of connections with other web pages in the same set of web pages than web pages in other sets; and
calculating for each of said web pages a value indicative of the extent to which a web page is associated with links connecting web pages in different sets of web pages.

8. The method of claim 6 wherein generating at least one network metric for said sample web pages indicative of the extent to which each sample web page is associated with hyperlinks connecting other web pages which are otherwise poorly connected to each other comprises:
associating each of said web pages with co-ordinate data;
updating said co-ordinate data so as to cause the co-ordinate data of web pages connected by hyperlinks to identify co-ordinates closer together and to cause co-ordinate data of web pages which are not connected to each other to identify co-ordinates further apart; and
calculating for each of said web pages a value indicative of the extent to which a web page is associated with links connecting web pages in different sets of web pages on the basis of the Cartesian lengths of the hyperlinks associated with the web page.

9. The method of claim 8 wherein associating each of said web pages with co-ordinate data comprises associating web pages with co-ordinate data on the basis of textual analysis of data appearing in a webpage.

10. The method of claim 9 wherein said textual analysis is such to associate web pages relating to similar subjects with similar co-ordinate values.

11. A search engine comprising:
a web page data base operable to store a number of sample web pages;
a network data generation module operable to process sample web pages stored in the web page data base to generate network data indicative of the interconnections between the sample web pages as identified by hyperlinks included in the sample web pages;
a network metric calculation module operable to utilize network data to generate for each of said web pages a plurality network metrics indicative of the extent to which the interconnections associated with a web page correspond to defined patterns of interconnections;
a ranking engine operable to use network metrics generated by the network metric calculation module to generate a plurality of ranked indices of web pages; and
a query server responsive to receipt of a search query including an indication of an index to be utilized to output a results list identifying a number of web pages wherein the results list is ordered on the basis of the index indicated in the search query.

12. A method of generating a ranked index of web pages, the method comprising:
processing a number of sample web pages to generate network data indicative of the interconnections between the sample web pages as identified by hyperlinks included in the sample web pages;
utilizing the generated network data to generate for each of said web pages one or more network metrics indicative of the extent to which the interconnections associated with a web page correspond to patterns of interconnections associated with web pages published in order to manipulate the ranking of a web page by a search engine; and
using the generated network metrics to generate a ranked index of web pages wherein the influence of web pages associated with patterns of interconnections associated with web pages published in order to manipulate the ranking of web pages by a search engine is reduced relative to the influence of web pages which are not associated with such patterns of interconnections.

13. The method of claim 12 wherein a plurality of network metrics indicative of the extent to which the interconnections associated with a web page correspond to patterns of interconnections associated with web pages published in order to manipulate the ranking of a web page by a search engine are calculated and a measure of the extent a webpage is associated with patterns of interconnections associated with web pages published in order to manipulate the ranking of a web page is determined as a function of the plurality of calculated network metrics.

14. The method of claim 12 wherein the generation of a ranked index reduces the influence of web pages associated with patterns of interconnections associated with web pages published in order to manipulate the ranking of web pages by a search engine by associating said web pages with ranking lower than equivalent pages which are not associated with such patterns of interconnections.

15. The method of claim 12 wherein the generation of a ranked index comprises determining a ranking score of each web page based upon a function dependent upon the connections between a web page and other web pages wherein said function is such that the ranking of web pages associated with other web pages associated with network metrics indicative of patterns of interconnections associated with web pages published in order to manipulate the ranking of web pages by a search engine result in lower ranking scores than web pages connected to other web pages which are not associated with such patterns of interconnections.

16. The method of claim 12 wherein generating one or more network metrics indicative of the extent to which the interconnections associated with a web page correspond to patterns of interconnections associated with web pages published in order to manipulate the ranking of a web page by a search engine comprises:
processing said generated network data to determine for each of said web pages a value indicative of the extent to which a web page is associated with hyperlinks connecting other web pages which are otherwise poorly connected to most of the rest of the sample of web pages.

17. The method of claim 16 wherein processing generated network data to determine for each of said web pages a value indicative of the extent to which a web page is associated with hyperlinks connecting other web pages which are otherwise poorly connected to most of the rest of the sample of web pages comprises: processing said generated network data to determine for each of said web pages a value indicative of the relative proportions of paths between other of said sample of web pages via connections which pass through said web page and paths between other of said sample web pages via connections which do not pass through said web page.

18. The method of claim 16 wherein processing generated network data to determine for each of said web pages a value indicative of the extent to which a web page is associated with hyperlinks connecting other web pages which are otherwise poorly connected to most of the rest of the sample of web pages comprises: processing said generated network data to determine for each of said web pages a value indicative of the relative proportions of paths between other of said sample of web pages via connections which pass through hyperlinks associated with said web page and paths between other of said sample web pages via connections which do not pass through hyperlinks associated with said web page.

19. The method of claim 12 wherein generating one or more network metrics indicative of the extent to which the interconnections associated with a web page correspond to patterns of interconnections associated with web pages published in order to manipulate the ranking of a web page by a search engine comprises: processing said generated network data to determine for each of said web pages a value indicative of the extent to which a web page is associated with hyperlinks connecting other web pages which are otherwise poorly connected to each other.

20. The method of claim 19 wherein processing generated network data to determine for each of said web pages a value indicative of the extent to which a web page is associated with hyperlinks connecting other web pages which are otherwise poorly connected to each other comprises:
processing said stored network data to divide said web pages into a number of sets of web pages, each of said sets of web pages comprising web pages having more similar patterns of connections with other web pages in the same set of web pages than web pages in other sets; and
calculating for each of said web pages a value indicative of the extent to which a web page is associated with links connecting web pages in different sets of web pages.

21. The method of claim 19 wherein processing generated network data to determine for each of said web pages a value indicative of the extent to which a web page is associated with hyperlinks connecting other web pages which are otherwise poorly connected to each other comprises:
associating each of said web pages with co-ordinate data;
updating said co-ordinate data so as to cause the co-ordinate data of web pages connected by hyperlinks to identify co-ordinates closer together and to cause co-ordinate data of web pages which are not connected to each other to identify co-ordinates further apart; and
calculating for each of said web pages a value indicative of the extent to which a web page is associated with links connecting web pages in different sets of web pages on the basis of the Cartesian lengths of the hyperlinks associated with the web page.

22. The method of claim 21 wherein associating each of said web pages with co-ordinate data comprises associating web pages with co-ordinate data on the basis of textual analysis of data appearing in a webpage.

23. The method of claim 21 wherein said textual analysis is such to associate web pages relating to similar subjects with similar co-ordinate values.

24. An apparatus for generating a ranked index of web pages, the apparatus comprising:
a web page data base operable to store a number of sample web pages;
a network data generation module operable to process sample web pages stored in the web page data base to generate network data indicative of the interconnections between the sample web pages as identified by hyperlinks included in the sample web pages;
a network metric calculation module operable to utilize network data generated by the network data generation module to generate for each of the web pages stored in the web page data store one or more network metrics indicative of the extent to which the interconnections associated with a web page correspond to patterns of interconnections associated with web pages published in order to manipulate the ranking of a web page by a search engine; and
a ranking engine operable to use network metrics generated by the network metric calculation module to generate a ranked index of web pages wherein the influence of web pages associated with patterns of interconnections associated with web pages published in order to manipulate the ranking of web pages by a search engine is reduced relative to the influence of web pages which are not associated with such patterns of interconnections.

25. A method of processing a search query comprising:
processing a number of sample web pages to generate network data indicative of the interconnections between the sample web pages as identified by hyperlinks included in the sample web pages;
processing the generated network data to determine for each of the web pages a value indicative of the relative proportions of paths between other of the sample of web pages via connections which pass through the web page and paths between other of the sample web pages via connections which do not pass through the web page;

generating a ranked index of web pages ranked utilizing the determined values;

receiving a search query; and outputting a results list in response to receipt of the search query identifying a number of web pages wherein the results list is ordered on the basis of the ranked index.

26. A method of processing a search query comprising:

processing a number of sample web pages to generate network data indicative of the interconnections between the sample web pages as identified by hyperlinks included in the sample web pages;

processing said generated network data to determine for each of said web pages a value indicative of the relative proportions of paths between other of said sample of web pages via connections which pass through hyperlinks associated with said web page and paths between other of said sample web pages via connections which do not pass through hyperlinks associated with said web page;

generating a ranked index of web pages ranked utilizing the determined values;

receiving a search query; and outputting a results list in response to receipt of the search query identifying a number of web pages wherein the results list is ordered on the basis of the ranked index.

27. A method of processing a search query comprising:

processing a number of sample web pages to generate network data indicative of the interconnections between the sample web pages as identified by hyperlinks included in the sample web pages;

processing the generated network data to divide the sample web pages into a number of sets of web pages, each of the sets of web pages comprising web pages having more similar patterns of connections with other web pages in the same set of web pages than web pages in other sets;

calculating for each of the sample web pages a value indicative of the extent to which a web page is associated with links connecting web pages in different sets of web pages;

generating a ranked index of web pages ranked utilizing the determined values;

receiving a search query; and outputting a results list in response to receipt of the search query identifying a number of web pages wherein the results list is ordered on the basis of the ranked index.

28. A method of processing a search query comprising:

processing a number of sample web pages to generate network data indicative of the interconnections between the sample web pages as identified by hyperlinks included in the sample web pages;

associating each of the sample web pages with co-ordinate data;

updating the co-ordinate data so as to cause the co-ordinate data of web pages connected by hyperlinks to identify co-ordinates closer together and to cause co-ordinate data of web pages which are not connected to each other to identify co-ordinates further apart;

calculating for each of the sample web pages a value indicative of the extent to which a web page is associated with links connecting web pages in different sets of web pages on the basis of the Cartesian lengths of the hyperlinks associated with the web page generating a ranked index of web pages ranked utilizing the determined values;

receiving a search query; and outputting a results list in response to receipt of the search query identifying a number of web pages wherein the results list is ordered on the basis of the ranked index.

29. The method of claim 28 wherein associating each of said web pages with co-ordinate data comprises associating web pages with co-ordinate data on the basis of textual analysis of data appearing in a webpage.

30. The method of claim 29 wherein said textual analysis is such to associate web pages relating to similar subjects with similar co-ordinate values.

31. A method of processing a search query comprising:

processing a number of sample web pages to generate network data indicative of the interconnections between the sample web pages as identified by hyperlinks included in the sample web pages;

processing the generated network data to determine for each of the web pages a value indicative of the extent each of the web pages is within a portion of the sample of web pages which are well connected to each other;

generating a ranked index of web pages ranked utilizing the determined values;

receiving a search query; and outputting a results list in response to receipt of the search query identifying a number of web pages wherein the results list is ordered on the basis of the ranked index.

32. The method of claim 31 wherein processing the generated network data to determine for each of the web pages a value indicative of the extent each of the web pages is within a portion of the sample of web pages which are well connected to each other comprises:

utilizing the generated network data to determine for each of the sample web pages, the set of web pages connected to that web page by hypertext links; and calculating for each of the sample web pages a value indicative of the extent to which the web pages in an identified set of web pages associated with a web page are connected to each other.

33. The method of claim 31 wherein processing the generated network data to determine for each of the web pages a value indicative of the extent each of the web pages is within a portion of the sample of web pages which are well connected to each other comprises:

ordering the sample web pages by the number of hyperlinks associated with the web page; and processing each of the web page in order to associate each of the web pages with a value wherein the value is:

indicative of the number of hyperlinks associated with the page, if none of the hyperlinks associated with the web page link to web pages which have previously been processed and associated with a value; or indicative of the greatest number associated with a web page previously processed and associated with a value which is linked to the current web page by a hyperlink where the current web page is linked to at least that number of web pages associated with such a value or which have not yet been processed and associated with a value.

34. The method of claim 31 wherein processing the generated network data to determine for each of the web pages a value indicative of the extent each of the web pages is within a portion of the sample of web pages which are well connected to each other comprises:

associating web pages linked by at least a threshold number of hyperlinks with a value; and iteratively incrementing the values associated with web pages linked only with web pages associated with values in excess of the current iteration number until no values are updated during an iteration.

35. A method of processing a search query comprising:
processing a number of sample web pages to generate network data indicative of the interconnections between the sample web pages as identified by hyperlinks included in the sample web pages;
processing the generated network data to determine for each web page a value indicative of the number of hyperlinks in the shortest path between the web page and the other web pages in the sample;
generating a ranked index of web pages ranked utilizing the determined values;
receiving a search query; and
outputting a results list in response to receipt of the search query identifying a number of web pages wherein the results list is ordered on the basis of the ranked index.

36. The method of claim 35 wherein the value indicative of the shortest path between the web page and the other web pages in the sample comprises determining the number of hyperlinks in the shortest path from the current web page to another web in the sample of web pages which has the greatest number of links.

37. The method of claim 35 wherein the value indicative of the shortest path between the web page and the other web pages in the sample comprises determining the number of hyperlinks in the shortest path from another web in the sample of web pages to the current web page which has the greatest number of links.

38. The method of claim 35 wherein the value indicative of the shortest path between the web page and the other web pages in the sample comprises determining an estimate of the average number of hyperlinks in the shortest path from the current web page to other web pages in the sample of web pages.

39. The method of claim 35 wherein the value indicative of the shortest path between the web page and the other web pages in the sample comprises determining an estimate of the average number of hyperlinks in the shortest path from other web pages in the sample of web pages to the current web page.

40. A method of processing a search query comprising:
identifying a seed set of web pages containing hyperlinks;
utilizing the seed set of web pages to identify a sample set of web pages directly or indirectly linked by hyper links to the web pages of the seed set of web pages;
processing the sample web pages to generate network data indicative of the interconnections between the sample web pages as identified by hyperlinks included in the sample web pages;
generating a ranked index of web pages by assigning the web pages a ranking on the basis of the closeness of connection of a web page to the web pages in the seed set;
receiving a search query; and
outputting a results list in response to receipt of the search query identifying a number of web pages wherein the results list is ordered on the basis of the ranked index.

41. The method of claim 40 wherein generating a ranked index of web pages by assigning the web pages a ranking on the basis of the closeness of connection of a web page to the web pages in the seed set comprises:
assigning the web pages in the seed set successive node numbers;
assigning each of the web pages in the set of sample web pages a node number successive to the node number assigned to the web pages in the seed set, wherein the node numbers assigned to the web page in the sample set of web pages are assigned in the order in which the sample web pages are retrieved from the internet;
assigning ranking numbers for the web pages in the seed set of node numbers and the sample set of web pages by considering the web pages in the order of the assigned node numbers and assigning successive ranking numbers to a web page and web pages linked to a web page which have not previously been assigned a ranking number.

42. The method of claim 40 wherein generating a ranked index of web pages by assigning the web pages a ranking on the basis of the closeness of connection of a web page to the web pages in the seed set comprises:
assigning the web pages in the seed set successive node numbers;
assigning each of the web pages in the set of sample web pages a node number successive to the node number assigned to the web pages in the seed set, wherein the node numbers assigned to the web page in the sample set of web pages are assigned in the order in which the sample web pages are retrieved from the internet;
assigning ranking numbers for the web pages in the seed set of node numbers and the sample set of web pages by considering the web pages in the order of the assigned node numbers,
determining whether a web page has already been assigned a ranking number; and
if a web page has not been assigned a ranking number, identifying the web pages linked to the web page under consideration by hyperlinks and assigning the web page under consideration and any other web page linking to the same set of web pages as are linked to by the web page under consideration the next available ranking number.

* * * * *